United States Patent
Laird et al.

(10) Patent No.: US 10,146,807 B2
(45) Date of Patent: Dec. 4, 2018

(54) SYSTEMS AND METHODS FOR APPLYING CONSTRUCTS TO A RECEIVED DATA SET

(71) Applicant: CPM Methods, Inc., Sunnyvale, CA (US)

(72) Inventors: Madison Laird, Sunnyvale, CA (US); Rahul Argade, Sunnyvale, CA (US)

(73) Assignee: CPM METHODS, INC., Sunnyvale, CA (US)

( * ) Notice: Subject to any disclaimer, the term of this patent is extended or adjusted under 35 U.S.C. 154(b) by 585 days.

(21) Appl. No.: 14/700,956

(22) Filed: Apr. 30, 2015

(65) Prior Publication Data
US 2015/0317369 A1 Nov. 5, 2015

Related U.S. Application Data

(60) Provisional application No. 61/986,768, filed on Apr. 30, 2014.

(51) Int. Cl.
*G06Q 10/10* (2012.01)
*G06F 17/30* (2006.01)
*G06F 3/0484* (2013.01)

(52) U.S. Cl.
CPC .... *G06F 17/30289* (2013.01); *G06F 3/04842* (2013.01); *G06F 3/04847* (2013.01); *G06F 17/30321* (2013.01); *G06F 17/30554* (2013.01); *G06F 17/30589* (2013.01); *G06F 17/30598* (2013.01); *G06Q 10/10* (2013.01)

(58) Field of Classification Search
None
See application file for complete search history.

(56) References Cited

U.S. PATENT DOCUMENTS

| 2002/0184401 | A1* | 12/2002 | Kadel, Jr. | G06F 9/4443 719/310 |
| 2012/0233090 | A1* | 9/2012 | Tavares | G06Q 40/06 705/36 R |
| 2015/0301921 | A1* | 10/2015 | Kumar | G06F 11/3612 714/38.1 |

OTHER PUBLICATIONS

Arnoldus et al. Repleo: a Syntax-Safe Template Engine, GPCE '07 Proceedings of the 6th international conference on Generative programming and component engineering pp. 25-32, Salzburg, Austria—Oct. 1-3, 2007.*
The Java Tutorials: Copying a File or Directory, Dec. 16, 2013.*

* cited by examiner

*Primary Examiner* — Kee M Tung
*Assistant Examiner* — Yanna Wu
(74) *Attorney, Agent, or Firm* — Dergosits & Noah LLP

(57) ABSTRACT

Systems and methods are described for applying predefined constructs to data sets to generate visualizations. A server may provide a construct library that includes a plurality of constructs organized into a hierarchical system based on topics associated with financial planning. Each construct includes a predetermined processing method that calculates a construct output based on received input data. The server may receive a selection of a construct, from the construct library, and a data set. The received data set is mapped to the selected construct and applied the selected construct to the mapped data set. The applying may include automatically retrieving the received input data from the mapped data set and calculating the construct output. Furthermore, the server may automatically generate a first visualization based on the construct output. The server may then cause the first visualization to be displayed on a client device.

20 Claims, 22 Drawing Sheets

FIG. 9

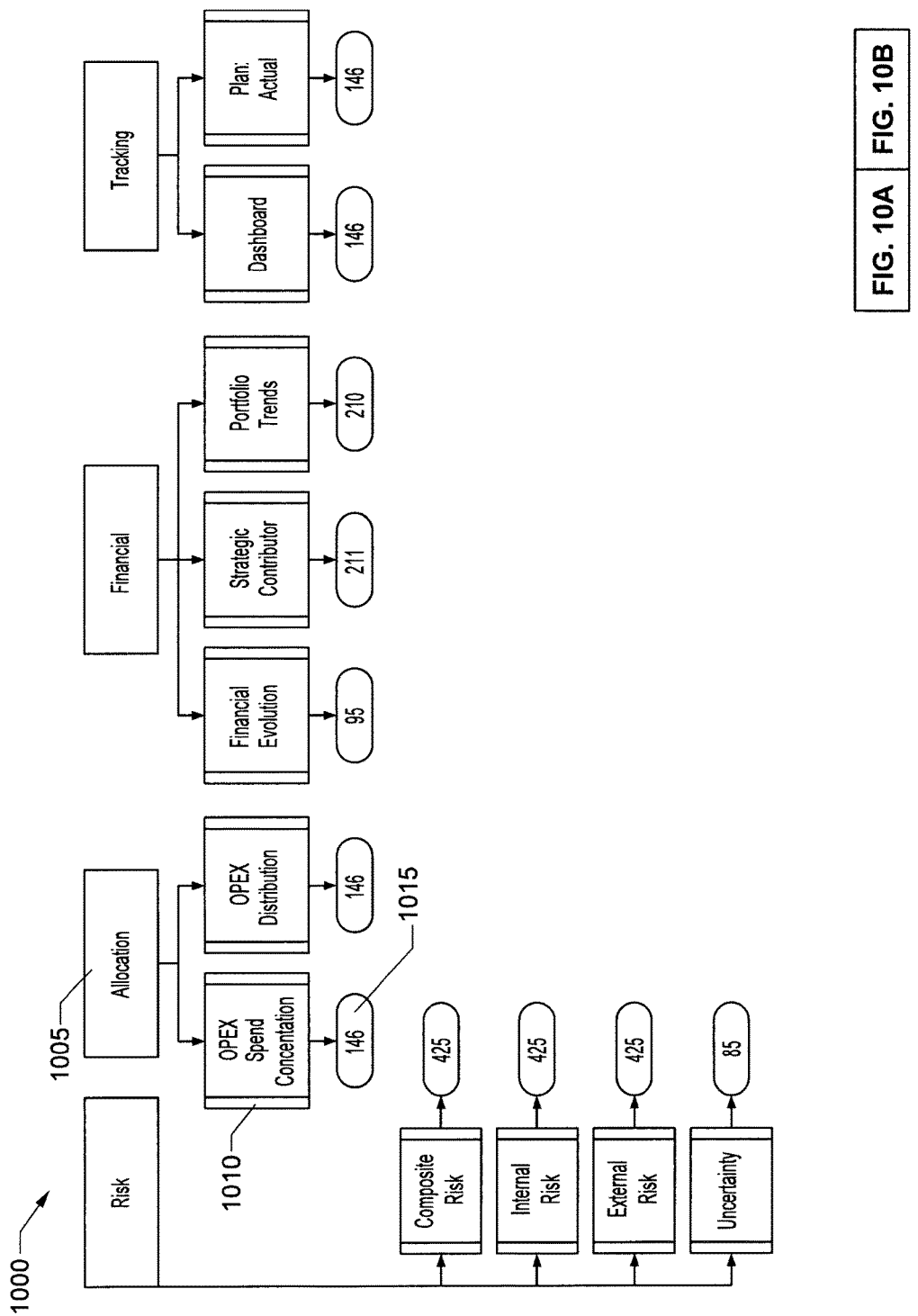

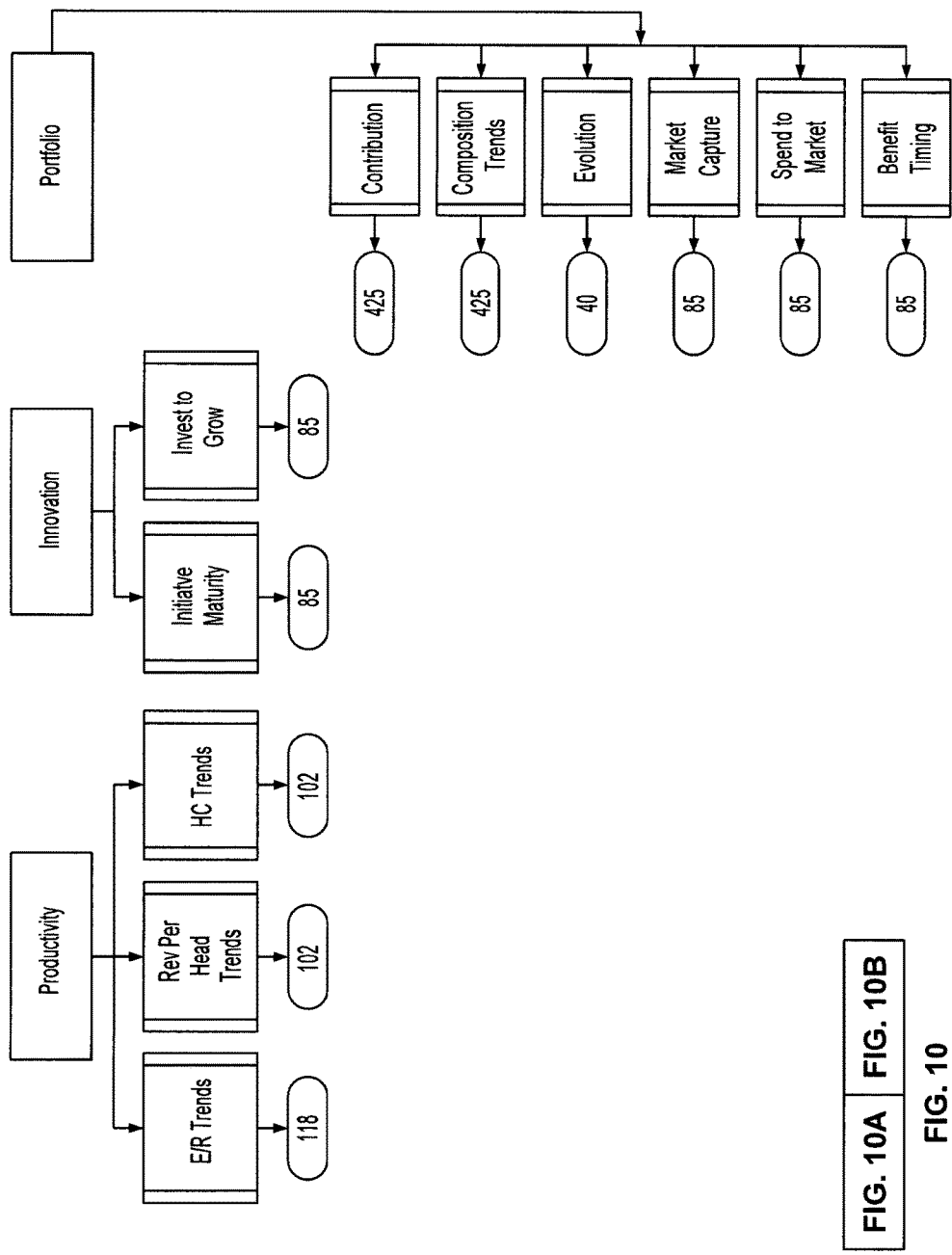

FundingProfiles Admin

- Home
- Categories
- Wizard
- Users

EditConstruct

Construct

| Save Construct | Edit Chart Info | Cancel |
| Details | Columns | Rows |

Create Row
Construct Rows:

| Header | Does Execute | Options |
|---|---|---|
| Q1 2012 Revenue | True | Edit \| Copy \| Delete |
| Q2 2012 Revenue | True | Edit \| Copy \| Delete |
| Q3 2012 Revenue | True | Edit \| Copy \| Delete |
| Q4 2012 Revenue | True | Edit \| Copy \| Delete |
| Q1 2013 Revenue | True | Edit \| Copy \| Delete |
| Q2 2013 Revenue | True | Edit \| Copy \| Delete |
| Q3 2013 Revenue | True | Edit \| Copy \| Delete |
| Q4 2013 Revenue | True | Edit \| Copy \| Delete |

☐ Save this chart output to constructs?
None ▼
None ▼
Generate Chart
ConStore

Save

Back to List

FIG. 18

FundingProfiles Admin

- ⌂ Home
- 📁 Categories
- 👤 Wizard
- 👤 Users

EditConstructColumn

ConstructColumn

☑ Should the results of this Row appear on the chart? ─── 1915
☐ Do the headers of this Row get generated dynamically?
☐ This Row should generate it's self Row Name:
[Q1 2012 Revenue]

Formula

☑ Does this formula execute?
Project Type:
[Actual ▽]
Year Filter:
[2011 ▽]
Quater Filter:
[Q1 ▽]
Row Name:
[Revenue ▽]
Formula:
[{CpmFunction}]

[Save]

Back to Construct

FIG. 19

FundingProfiles Admin

✧ Home

🗁 Categories
- × Allocation
- × Contribution
- × Financial
- × Productivity
- × Portfolio
- × Risk
- × Testing 🧙 Wizard 👤 Users EditChartInfo ChartInfo Chart Type:
[Line ▾]

Formatting Options:

V Axis Format:
[Currency]

V Axis Title:
[Thousands of US$D]

X Axis Format:
[Percentage]

X Axis Title:
[Contribution Margin ×]

[Save]

Back to Construct

FIG. 20

SYSTEMS AND METHODS FOR APPLYING CONSTRUCTS TO A RECEIVED DATA SET

CROSS-REFERENCE TO RELATED APPLICATIONS

This application claims priority to provisional U.S. Patent Application No. 61/986,768, filed on Apr. 30, 2014 and entitled "FP Generator", which is incorporated herein in its entirety.

TECHNICAL FIELD

This disclosure relates generally to the technical field of computer-implemented methods for linking data with visualizations. Specifically, the disclosure describes applying sets of predetermined constructs to received data sets to modify the received data and automatically generate visualizations from the output of the predetermined constructs.

SUMMARY OF THE INVENTION

Systems and methods are described for applying constructs to data sets to generate visualizations. A server may provide a construct library that includes a plurality of constructs. Construct libraries and the constructs therein may relate to a wide number of fields, including, but not limited to, financial planning, customer behavior, etc. The plurality of constructs may be organized into a hierarchical system based on topics, each construct including a predetermined processing method that calculates a construct output based on received input data. The server may receive a selection of a construct (or a framework including a set of constructs), from the construct library, and a data set. The data set may be generated externally, and imported to the server, or be created by a client device in communication with the server.

The server may map the received data set to the selected construct and apply the selected construct to the mapped data set. The applying may include automatically retrieving the received input data from the mapped data set and calculating the construct output. Furthermore, the server may automatically generate a first visualization based on the construct output. The server may then cause the first visualization to be displayed on a client device (e.g., the client device from which the construct selection and data set are received). A major benefit of the platform for generating profiles is that multiple constructs (i.e., a framework) may be selected and applied to selected datasets to generate multiple visualizations in real time. Additional embodiments may include methods for creating additional constructs, and other useful features.

BRIEF DESCRIPTION OF THE FIGURES

This disclosure is illustrated by way of example and not limitation in the figures of the accompanying drawings, in which like references indicate similar elements, and in which:

FIG. 9 is a screenshot illustrating configurable settings according to an exemplary embodiment for creating and/or editing a construct.

FIG. 10 is an exemplary hierarchy for a construct library according to an exemplary embodiment.

FIG. 18 is a screenshot illustrating configurable settings for a construct according to various embodiments.

FIG. 19 is a screenshot illustrating configurable settings for a construct according to various embodiments.

FIG. 20 is a screenshot illustrating configurable settings for a construct according to various embodiments.

DETAILED DESCRIPTION

Figure 1:
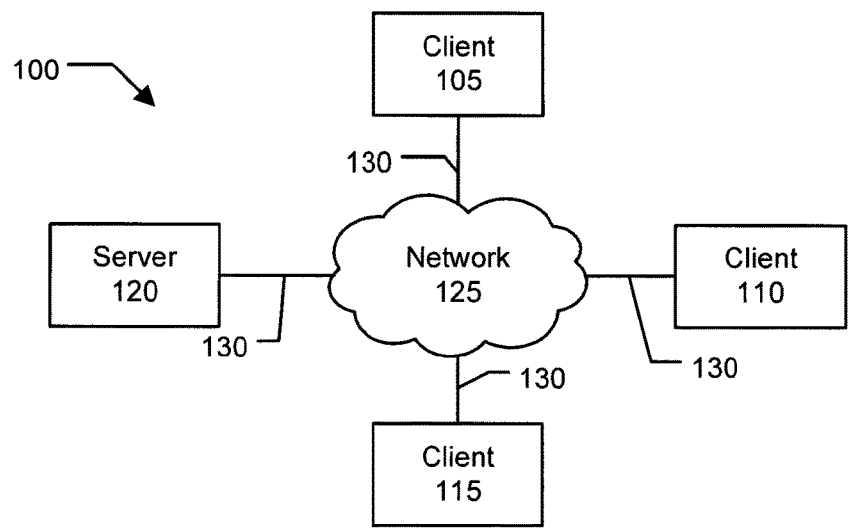
FIG. 1 shows a simplified block diagram of a distributed computing network connecting a server and devices in which a system for applying constructs for analysis to a data set may be implemented.

When creating analytic presentations for key decision makers, conventional planning tools and business intelligence ("BI") tools have difficulty visualizing complex portfolios. Conventional software tools, including BI, customer relationship management ("CRM"), and enterprise resource planning ("ERP") tools, may provide strengthened financial tracking and reporting, and analyze various scenarios. However, even "advanced" BI applications require users to start with a hunch about data and drill down into the data using a process of trial-and-error hypothesis testing until issues are uncovered. Time constraints and governance requirements mean teams often present inferior, incomplete, erroneous, or inaccurate analytics when attempting to support analysis and decision making.

For conventional BI applications, it may be more efficient and effective to build a data model or to access the backend source data in order to attempt to fit a user defined visualizations (be they single charts, full reports, dashboards, or ad hoc investigations, for example.) No applications currently embrace the alternative—empowering users to create their own multiple visualizations quickly from built-in "building blocks" which the data model has already been manipulated to support.

The present invention helps overcome the difficulties in generating visualizations from complex portfolios. A server may provide a construct library that includes a plurality of constructs. The plurality of constructs may be organized into a hierarchical system based on topics associated with financial planning, each construct including a predetermined processing method that calculates a construct output based on received input data. The server may receive a selection of a construct, from the construct library, and a data set. The server may map the received data set to the selected construct and apply the selected construct to the mapped data set. The applying may include automatically retrieving the received input data from the mapped data set and calculating the construct output. Furthermore, the server may automatically generate a first visualization based on the construct output. The server may then cause the first visualization to be displayed on a client device (e.g., the client device from which the construct selection and data set are received).

Much more than a self-service dashboard creation application, the framework and construct-oriented approach described herein frees analysts up from trying to become power users of applications so they can use their expertise in reviewing output and providing analysis. The visualization generator may include data preparation tools for creating a unified )37 DataMart, "self-service tools to create datasets for analysis (e.g. scenarios), and an extensive library of visualization objects that represent building blocks which can be combined by users into logical "frameworks." A very unique capability is that users create their own framework, and each framework can analyze multiple datasets. With a single click, a whole set of graphs and charts may be populated by data from a new dataset, or multiple datasets. Using the visualization generator's unique comparison function, users can apply any framework to multiple datasets, and the output can be compared side-by-side. With conventional spreadsheet visualization and dashboard tools, each chart or graph normally must be re-created for each dataset. Given time constraints and governance considerations, the visualization "metaphor" used by other products is inferior to the visualization generator described herein. These benefits are most apparent when multiple complex business scenarios requiring advanced visualizations from different stakeholder viewpoints need to be analyzed.

FIG. 1 is a simplified block diagram of a distributed computer network 100. Computer network 100 includes a number of client systems 105, 110, and 115, and a server system 120 coupled to a communication network 125 via a plurality of communication links 130. There may be any number of clients and servers in a system. Communication network 125 provides a mechanism for allowing the various components of distributed network 100 to communicate and exchange information with each other.

Communication network 125 may itself be comprised of many interconnected computer systems and communication links. Communication links 130 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 125 is the Internet, in other embodiments, communication network 125 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 120 may be connected to communication network 125. As another example, a number of client systems 105, 110, and 115 may be coupled to communication network 125 via an access provider (not shown) or via some other server system.

Client systems 105, 110, and 115 allow users to access and query information stored by server system 120. In a specific embodiment, a web browser application executing on a client system enables users to select, access, retrieve, or query information stored by server system 120. Examples of web browsers include the Internet Explorer® browser program provided by Microsoft® Corporation, and the Firefox® browser provided by Mozilla® Foundation, and others.

Figure 2A:
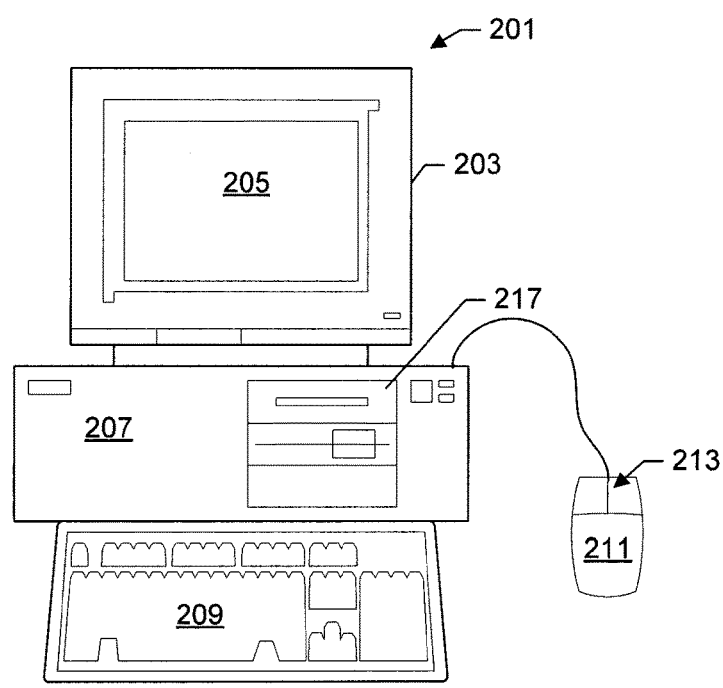
FIG. 2A shows a more detailed diagram of an exemplary client or computer that may be used in an embodiment of the system.

FIG. 2A shows an example client or server system. In an embodiment, a user interfaces with the system through a computer workstation system, such as shown in FIG. 2A. FIG. 2A shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 2B:
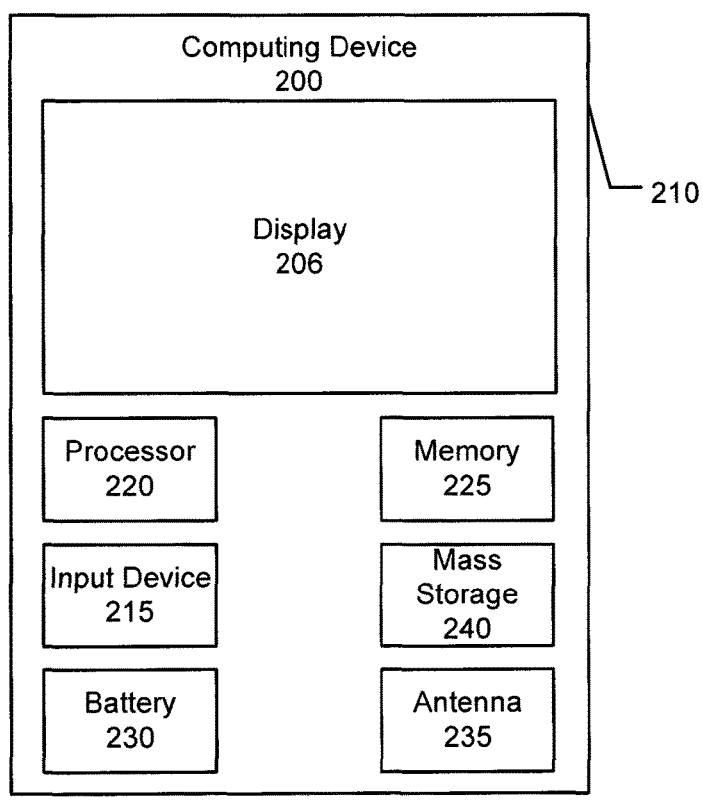
FIG. 2B shows a more detailed diagram of an exemplary mobile communications device.

FIG. 2B shows a specific embodiment of a computer system such as a mobile client system of the present invention. In an embodiment, a user interfaces with the system through a client system, such as shown in FIG. 2B. Mobile client communication or portable electronic device 200 includes a display, screen, or monitor 206, housing 210, and input device 215. Housing 210 may house familiar computer components, some of which are not shown, such as a processor 220, memory 225, battery 230, speaker, transceiver, antenna 235, microphone, ports, jacks, connectors, camera, input/output (I/O) controller, display adapter, network interface, mass storage devices 240, and the like and various combinations thereof. These components may be connected using any interconnection scheme or bus architecture.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or a combination of these.

Mass storage devices 240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

The invention may also be used with computer systems having different configurations, e.g., with additional or fewer subsystems. For example, a computer system could include more than one processor (i.e., a multiprocessor system, which may permit parallel processing of information) or a system may include a cache. The computer system shown in FIG. 2B is but an example of a computer system suitable for use with the present invention. Other configurations of subsystems suitable for use with the present invention will be readily apparent to one of ordinary skill in the art.

For example, in a specific implementation, the computing device is a mobile communication device such as a smartphone or tablet computer. Some specific examples of smartphones include the Droid Incredible and Google Nexus One, provided by HTC Corporation, the iPhone or iPad, both provided by Apple, and many others. Typically, these mobile or portable computing devices have less resources (e.g., memory, storage, smaller screens, or processing power) than a desktop computer. Further, such mobile or portable computing devices are designed to be powered primarily by a battery, rather than being constantly plugged in to a power outlet as in the case of a desktop computer. So, given these differences between portable and non-portable computing devices, it is generally desirable that applications on portable computing devices be small and lightweight (e.g., consume relatively fewer resources as compared to non-portable computing devices). The computing device may be a laptop or a netbook. In another specific implementation, the computing device is a non-portable computing device such as a desktop computer or workstation.

A computer-implemented or computer-executable version of the program instructions useful to practice the present invention may be embodied using, stored on, or associated with non-transitory computer-readable medium. Non-transitory computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the present invention may be stored or reside in RAM or cache memory, or on mass storage device 240. The source code of this software may also be stored or reside on mass storage device 240 (e.g., flash drive, hard disk, magnetic disk, tape, or CD-ROM). As a further example, code useful for practicing the invention may be transmitted via wires, radio waves, or through a network such as the Internet. In another specific embodiment, a computer program product including a variety of software program code to implement features of the invention is provided.

Computer software products may be written in any of various suitable programming languages, such as C, C++, C#, Pascal, Fortran, Perl, Matlab (from MathWorks, www-.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, bada, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows CE, Windows Mobile, Windows Phone 7), Linux, HP-UX, UNIX, Sun OS, Solaris, Mac OS X, Alpha OS, AIX, IRIX32, or IRIX64. Other operating systems may be used.

Furthermore, the mobile device or portable computer device may be connected to a network and may interface to other computers using this network. The network may be an intranet, internet, or the Internet, among others. The network may be a wired network (e.g., using copper), telephone network, packet network, an optical network (e.g., using optical fiber), mobile network, or a wireless network, or any combination of these. For example, data and other information may be passed between the mobile device or portable computer and components (or steps) of a system useful in practicing the invention using a mobile network employing a protocol such as code division multiple access (CDMA), Global System for Mobile Communications/General packet radio service (GSM)/(GPRS), Worldwide Interoperability for Microwave Access (WiMAX), or 3GPP Long Term Evolution (LTE) or a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers, or from mobile communications devices to other mobile communications devices.

Figure 3:
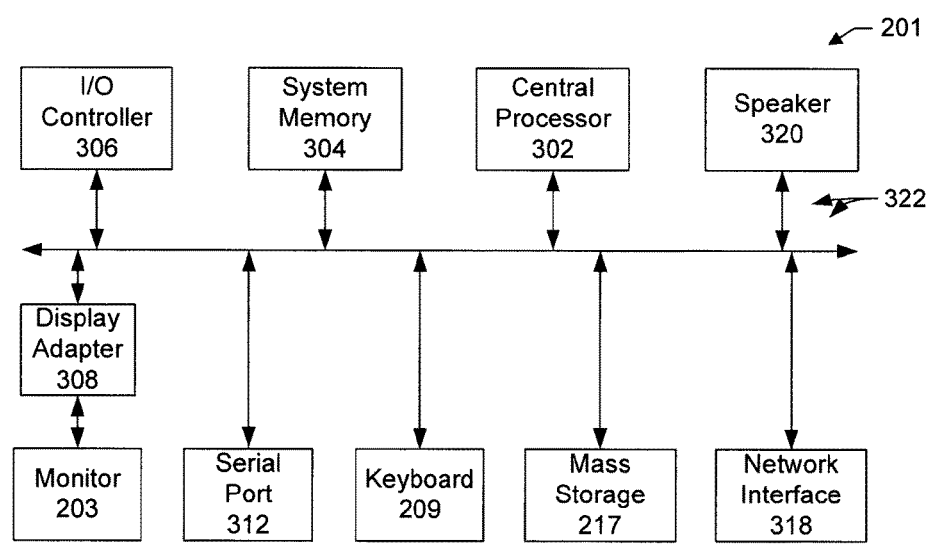
FIG. 3 shows a simplified block diagram of a specific embodiment of a client computer system for applying constructs to a data set.

FIG. 3 shows a system block diagram of computer system 201. As in FIG. 2A, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, IRIX64, or Google® Chrome OS. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
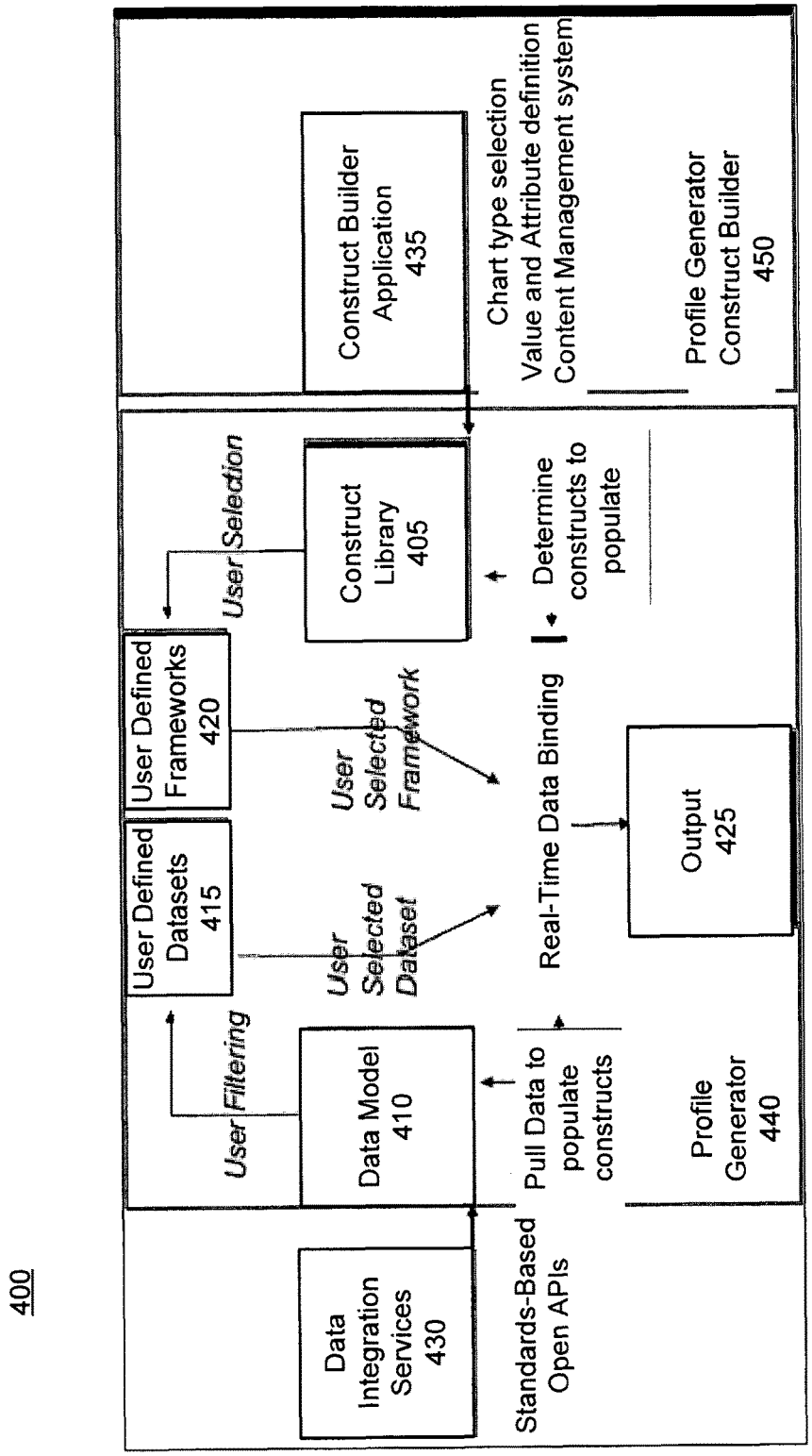
FIG. 4 shows a block diagram of another specific embodiment of a system architecture for applying constructs to a data set.

FIG. 4 shows a block diagram of another specific embodiment of a system architecture 400 for applying constructs to a data set. System 400 may include profile generator module 440, which may be a server that receives and applies constructs to received data sets, as described below. Profile generator module 440 may include construct library 405 and data model 410. The construct library 405 may include a plurality of predetermined constructs, which receive data from a data set and calculate construct outputs based on the received data. The construct output may include a visualization, such as a chart or graph. While construct library 405 is shown as part of profile generator 440 in exemplary system 400, the construct library 405 may be external to the profile generator 440 in some embodiments. A user may select desired constructs from the construct library 405, and the selected constructs may be contained in one or more user-defined frameworks 420. The user-defined frameworks 420 may each be a set of constructs having a related theme.

The data model 410 may include data (e.g., financial data) a user wishes to analyze using user-selected constructs. The data model 410 similarly may be a part of profile generator 440, or may be external to the profile generator 440. In some embodiments, the data in the data model 410 may be received from data integration services 430, which may communicate with the profile generator 440 via standards-based open APIs. The user may filter data in the data model 410 to obtain user-defined datasets 415, which may be a subset of the data in data model 410. The profile generator 410 may perform data binding to link the user-defined frameworks 420 and the user-defined data sets 415. The data binding may be performed in real time in some embodiments, as the profile generator 440 may know exactly which data it needs to call to populate the intersection of choices between the user-defined framework 420 and the user-defined dataset 415, and where in the data model to go and source that data. To perform the data binding i.e. apply the constructs in the user-defined framework to the user-selected dataset, the profile generator 440 may automatically pull data from the data model 410 and calculate construct output 425 for each construct in the user-defined framework. The process of applying constructs is further explained below. Binding the data in real time may be advantageous, by significantly reducing wait time for the constructs to render.

The system 400 may also include profile generator construct builder module 450, which may allow users to build their own constructs for inclusion in the construct library 405. While profile generator construct builder module 450 is shown to be external to profile generator 440, in some embodiments profile generator construct builder module 450 may be implemented on the same server or system. Profile generator construct builder module 450 may include construct builder application 435, which may be used to create user-generated constructs, as described below. Users may define a visualization or database type for the construct, and may also define values and attributes for a construct in some embodiments. Users may utilize the construct builder 450 to define constructs in a quick and easy manner. The construct builder 450 may define dimensions of the construct, operators, select the type of visualization to be used in the rendering, reference formulae and perform simple math on received data from data sets. The construct builder 450 may be implemented as a standalone application, or may be a part of an application that also includes the profile generator 440, allowing users to build their own constructs. These user-built constructs may be subsequently shared with other users, as part of an app store, for example.

Built in content management system for the construct builder 450 may allow users to build metadata, descriptions, and provide guidance for using created constructs. In an embodiment, the user defines the graphic to be used by the construct (e.g., choose chart type option 2010, see interface 2000, FIG. 20). For example, the user may choose to use a bubble chart, pie chart, line chart, column chart, etc. Depending on the selected type of graphic, the construct builder 450 may have up to 5 dimensions of inputs: 1 X input, 2 Y inputs, color, and size. The construct builder 450 may also permit custom legends and titles for constructs. The construct builder may permit the definition of rows (see interface 1800, FIG. 18, construct row definition interface 1805). The construct builder tool also may permit the copying, editing, or deleting of rows (see interface 1800, FIG. 18, Construct Row Definition Edit/Copy/Delete Function 1810). The new construct may be uploaded to the server, and added to the construct library. (see interface 1800 at save construct area 1815) The user may also be presented with an option to share the construct with other persons outside their organization, by choosing to add the construct to a shared environment. (see interface 1800 at button 1820) The shared environment may be a construct repository that is external to the profile generator, and may be implemented as an application store, or as a library accessible over a network and/or the Internet, for example. The construct repository may be accessible by a plurality of users over a network, allowing users to access constructs in the construct repository and add them to user-created frameworks.

The construct builder may permit the creation and editing of each individual row or column in the construct (see interface 1900, FIG. 19, which may be displayed in response to selecting "Edit" on function 1810). The construct builder may permit the editing of certain options in the construct. For example, the construct builder may allow a user to determine whether or not a selected row executes, whether or not the labels within the construct are user-defined, and whether or not the user generates the label data themselves, or allows the construct to generate label data automatically based on the chart type and formulae selected (see interface 1900, FIG. 19, row execution options 1915). The construct builder may also provide a mechanism for the entry of a row name (see interface 1900, FIG. 19, row name assignment 1920) and provide options for selecting the fields necessary for data to populate that particular row (see interface 1900, FIG. 19, row execution definitions 1925). The construct builder may further provide a mechanism for specifying the mathematical formula to be used in order to calculate a row in the construct (see interface 1900, FIG. 19, edit construct rows 1930).

Figure 16:
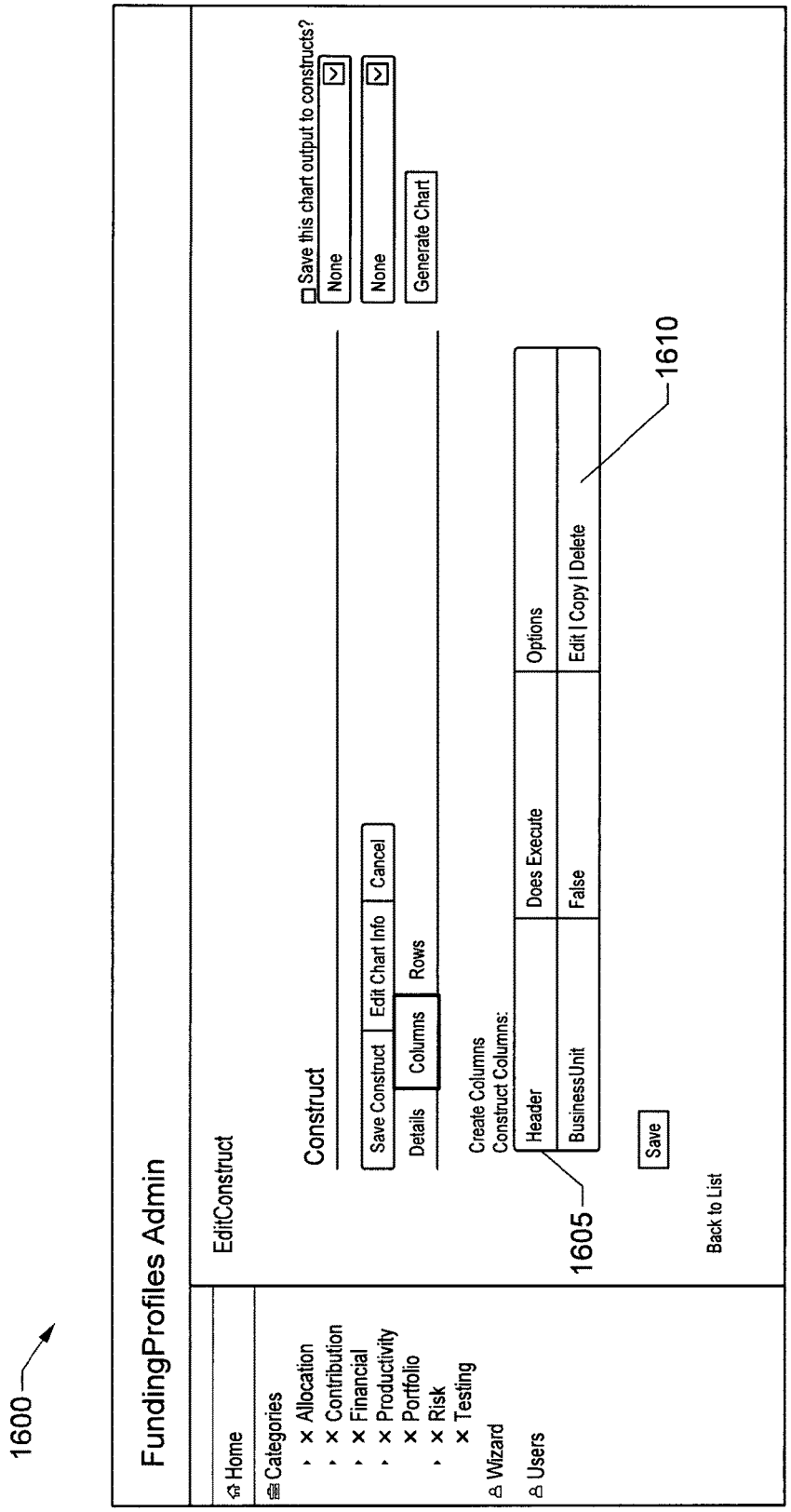
FIG. 16 is a screenshot illustrating configurable settings for a construct according to various embodiments.
Figure 17:
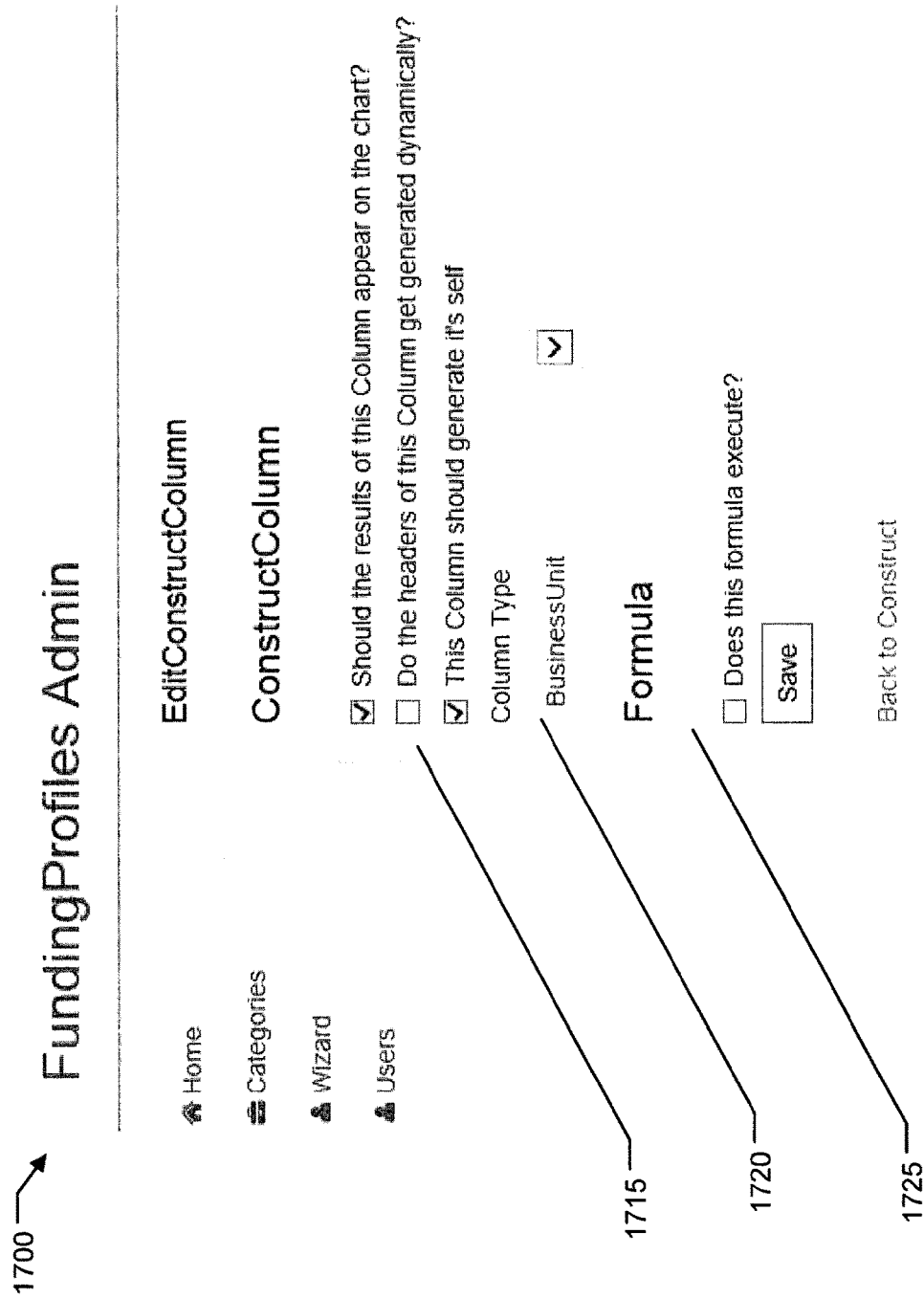
FIG. 17 is a screenshot illustrating configurable settings for a construct according to various embodiments.

The construct builder may also allow the inclusion by reference to certain common calculations when creating this formula (for example, ROI for "return on investment, or "CHI" for CHI squared.) The construct builder may permit the definition of columns (see interface 1600, FIG. 16, construct column definition 1605). The construct builder may permit the copying editing, or deleting of columns (see interface 1600, FIG. 16, construct column definition edit/copy/delete function 1610). The construct builder may permit the editing of each individual column in the construct (see interface 1900, FIG. 19) The construct builder may permit the editing of certain options in the construct (e.g., whether or not that column executes, whether or not the labels within the construct are user defined, and whether or not the user generates the data labels themselves (see interface 1700, FIG. 17, column specific options 1715). The construct builder may also provide a mechanism for the selection of a set of data within the data model by which this columns renders itself (see interface 1700, FIG. 17, attribute chooser 1720). The construct builder may include the ability to specify whether or not the column itself will be used in the creation of the construct (see interface 1700, FIG. 17, "execution option" 1725).

Figure 5A:
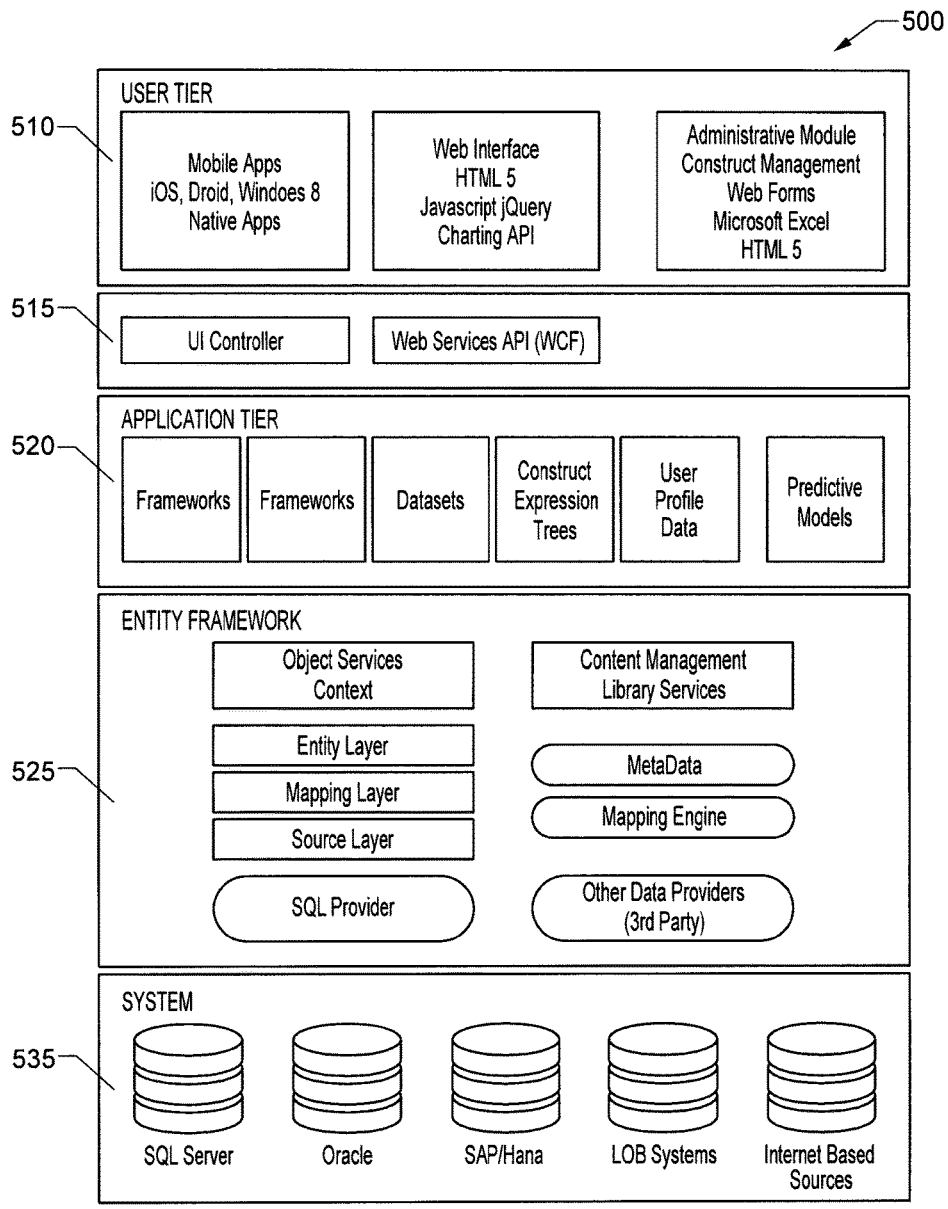
FIGS. 5A and 5B show a block diagram of another specific embodiment of system architecture for applying constructs to a data set.
Figure 5B:
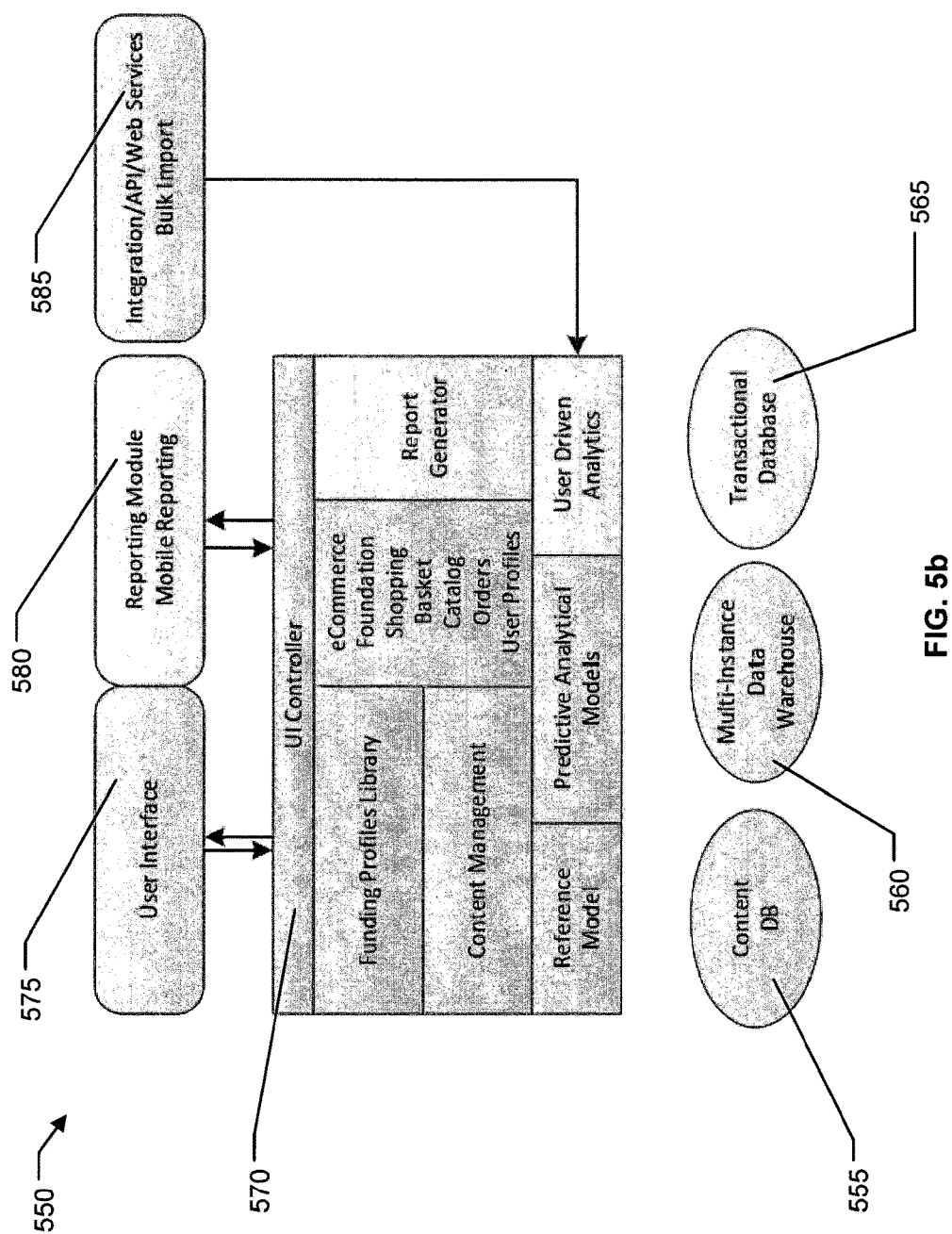

FIGS. 5A and 5B show a block diagram of another specific embodiment of a system architecture for applying constructs for analysis to a data set. The Content Management Library Services (part of 525 in FIG. 5a) and the "Funding Profiles library" (part of 570 in FIG. 5b) contains the construct library shown in FIG. 7, 710). The receipt of the construct selection depicted in FIG. 7 #715 is depicted by the technical areas represented in the second box labelled "frameworks" in part 520 of FIG. 5a and the "content management" portion of 570 in FIG. 5b. The "receive data set" function identified in FIG. 7 number 720 is portrayed in the technical areas labelled "datasets" in part 520 of FIG. 5a and the "reference model" portion of 570 in figure 5b. The "map received data to selected construct(s)" in FIG. 7 number 725 is portrayed in the "mapping layer" portion of 525 in FIG. 5a and the "user driven analytics" portion of 570 in FIG. 5b. The "apply selected construct(s) to mapped data set to calculate construct(s) output" is depicted by the "mapping engine" in portion 525 of FIG. 5a and the "report generator" portion of 570 in FIG. 5b. The "apply selected construct(s) to mapped data set to calculate construct(s) output" is depicted by 515 in FIGS. 5a and 570 in FIG. 5b. Step 735 in FIG. 7 "Automatically generate first chart based on construct output" is depicted in the arrows emanating from 570 and pointing to both 575 and 580 in FIG. 5b. This step is not depicted in FIG. 5a. Step 740 in FIG. 7—"Display first chart on client device" is depicted in step 510 of FIG. 5a—note that this step is not depicted in FIG. 5b. 535 in 5a and 555, 560, and 565 in FIG. 5b both constitute the repositories represented by the "data integration services" item 430 in FIG. 4. The "meta data" portion of 525 and the "reference model" portion of 570 in FIG. 5b both map to the "data model" box (410 in FIG. 4).

The "content management library services portion of 525 in FIG. 5a and the "content management" portion of 570 in FIG. 5b may both map to the "Construct Library" shown as 405 in FIG. 4. The "User Defined Datasets" and "User Defined Frameworks" shown as 415 and 420 in FIG. 4 are shown in the "Object Services Context" and the "Entity Layer" shows in 525 of FIG. 5a. The "User Defined Datasets" shown as 415 in FIG. 4 are shown as the "reference model" portion of 570 in FIG. 5b, and the "User Defined Frameworks" shown as 420 in FIG. 4 is shown as "User Driven Analytics" part of 570 in FIG. 5b. The "Output" shown as 425 in FIG. 4 is depicted in the "user tier" (510) of FIG. 5a, and the "User Interface" and "Reporting Module/Mobile Reporting" item 580 in FIG. 5b. The "Construct Builder Application" and "Profile Construct Builder" shown in 435 and 450 of FIG. 4 are not shown in FIG. 5a or 5b. The "Profile Generator" shown in 440 of FIG. 4 is depicted in both the Entity Framework and Application Tier (520 and 525) boxes in FIG. 5a, and in portion 570 in 5b.

Figure 6:
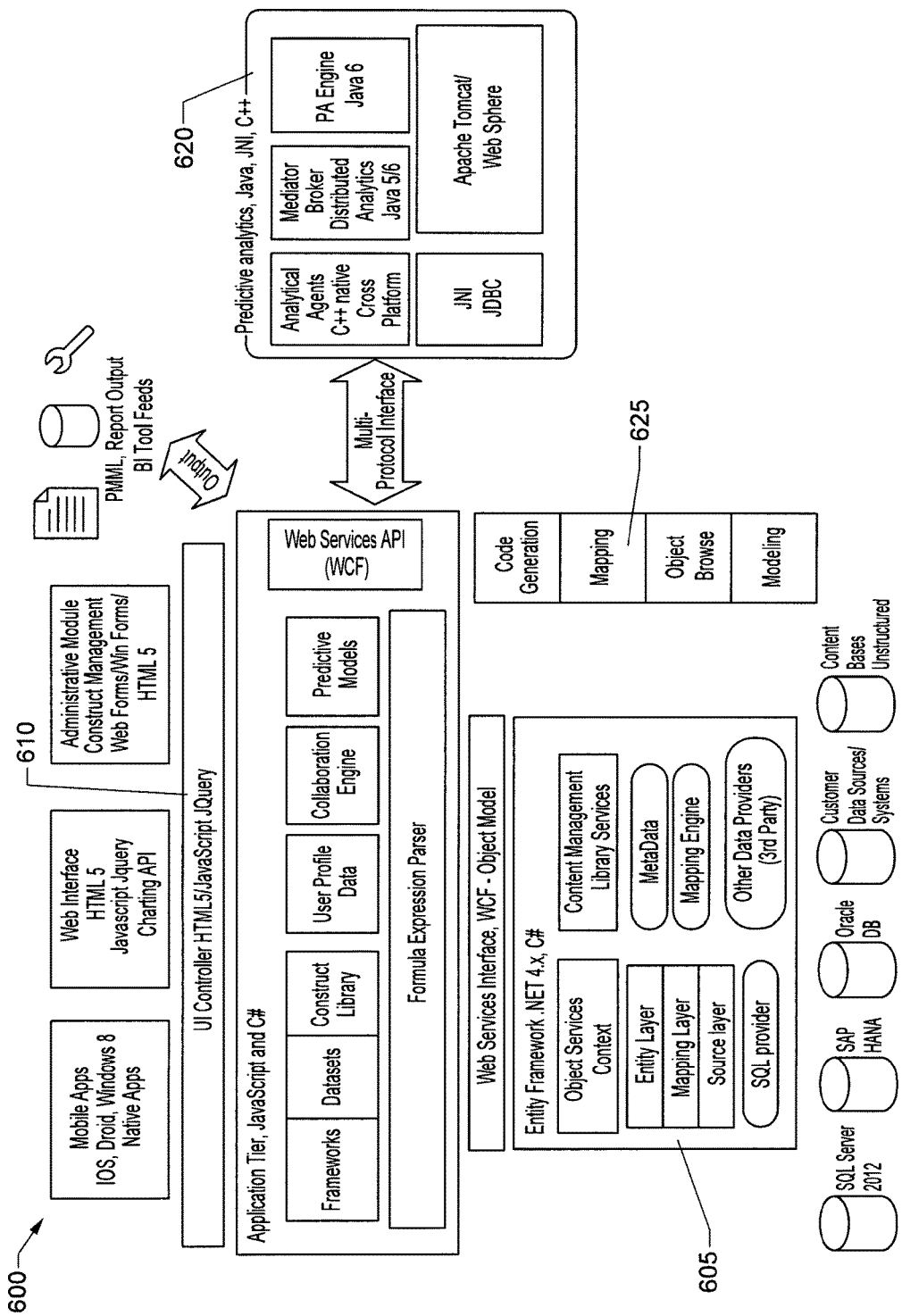
FIG. 6 shows another specific embodiment of system architecture for applying constructs to a data set.

FIG. 6 shows another specific embodiment of a system architecture for applying constructs to a data set. The "Data Integration Services" shown in 430 of FIG. 4 are shown in the "Mapping Layer" "Source Layer" "SQL Providers" and "Other Data Providers" portion of 605 in FIG. 6. The "Data Model" shown in 410 of FIG. 4 is shown in the "Metadata" level of 605 and the entire 625 portion of FIG. 6. The "Construct Library" shown in portion 405 of FIG. 4 is also shown in the "Content Management Library Services" portion of the entity framework as shown in 605 of FIG. 6, as well as the "Construct Library" box in the Application Tier of 610 in FIG. 6. The "User Defined Datasets" (415 of FIG. 4) and the "User Defined Frameworks" (420 of FIG. 4) are represented by the "Frameworks" and "Datasets" boxes in the "Application Tier" noted in 610 in FIG. 6. Note that the "Construct Builder Application" and the "Profile Generator Construct Builder" shown as 435 and 450 of FIG. 4 are not depicted in FIG. 6. The "Output" shown as 425 and the "Profile Generator" shown as 440 in FIG. 4, may be produced by the "Formula Expression Parser" portion of the Application Tier in 610 of FIG. 6 and delivered through the "UI Controller" within that same Application Tier.

Figure 7:
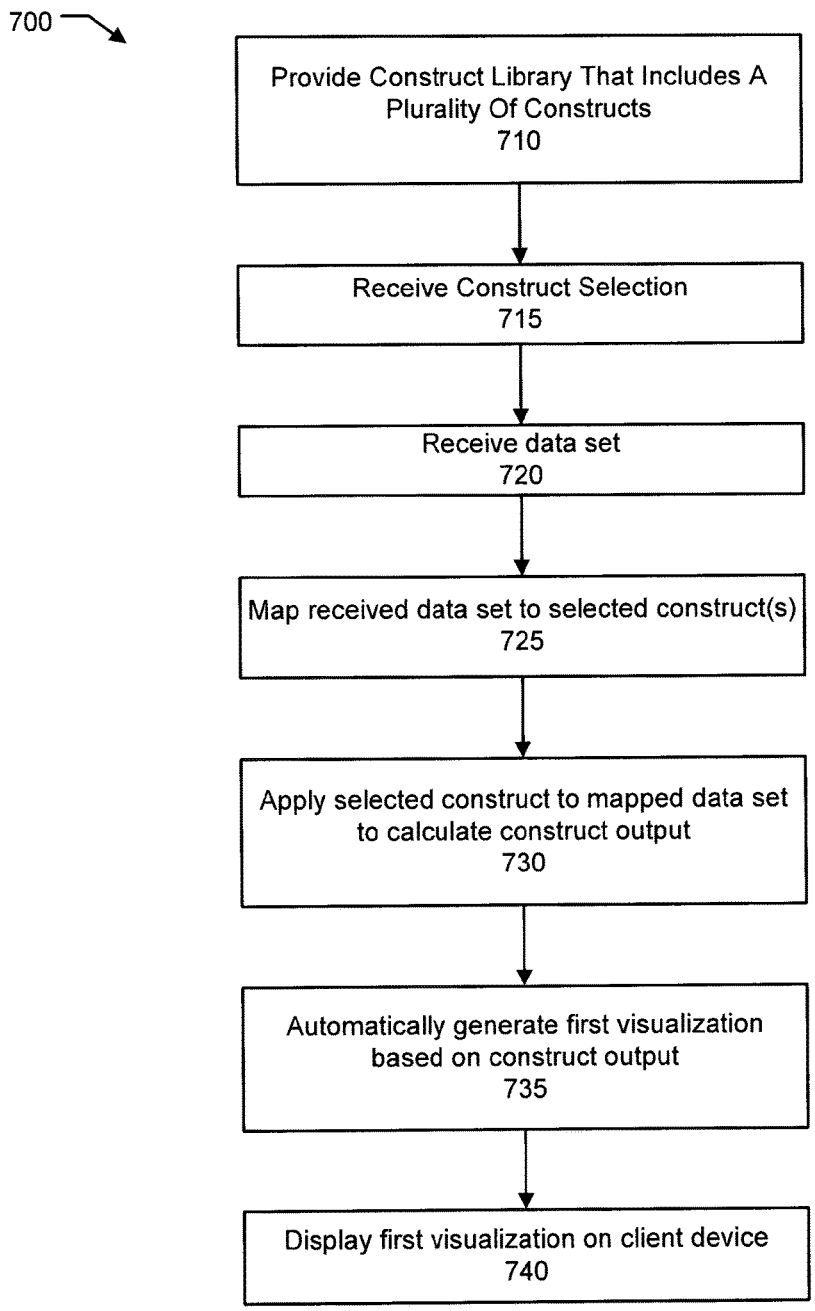
FIG. 7 shows a specific embodiment of a flow diagram applying constructs for analysis to a data set.

FIG. 7 shows a specific embodiment of a flow diagram of exemplary method 700 of applying constructs to a data set. A server may provide a construct library that includes a plurality of constructs at step 710. Each construct may include a predetermined processing method that calculates a construct output based on received input data. The plurality of constructs may be organized into a hierarchical system based on topics associated with financial planning in an exemplary embodiment.

Figure 8:
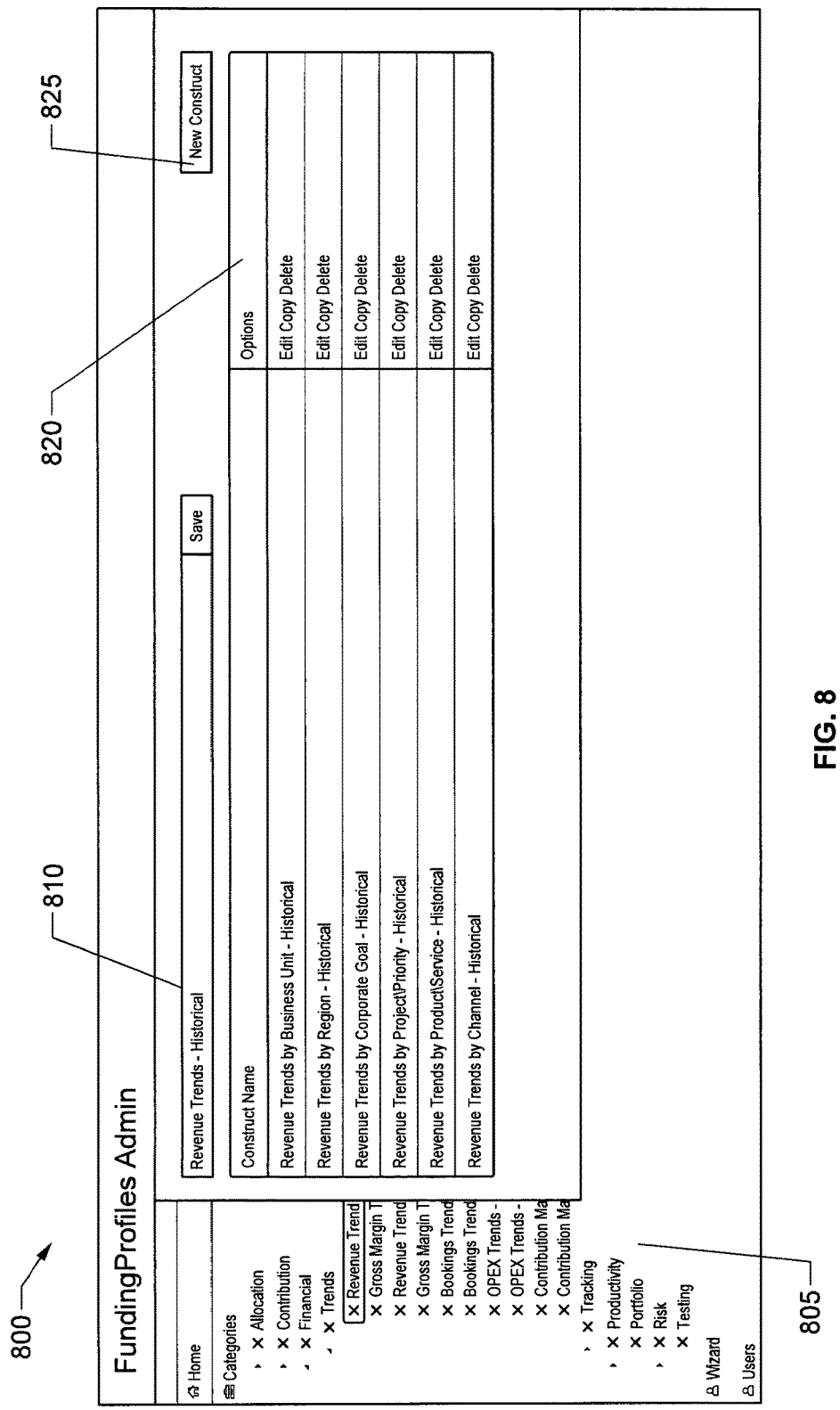
FIG. 8 is a screenshot illustrating an embodiment of an interface for browsing a construct library.

FIG. 8 is a screenshot illustrating an embodiment of an interface 800 for browsing a construct library. A user may browse through construct library hierarchy 805 to find a construct the user wishes to select. The construct library hierarchy 805 may be organized into topics, each topic including sub-topics and constructs associated with the topic. Box 810 may illustrate the name of a selected sub-topic and/or construct, as well as the classification of the selected sub-topic (e.g., "revenue trends," "Historical"). Area 820 shows a list of constructs that fall under the selected sub-topic, and may include options for a user to edit, copy or delete a construct. A user may also be provided with a selectable option 825 to create a new construct.

In response to selecting option 825, a user may be allowed to define a new construct, the new construct including a construct definition, defining how to calculate the construct output from received input data from the data set, and a construct classification, the construct classification being associated with a topic in the hierarchical system. The new construct may be uploaded to the server, and added to the construct library, as described above. In addition to allowing a user to define the operators used to calculate the construct output, the construct definition may also include the visualization type associated with the construct (which may be selectable via an interface, such as a drop-down menu). The construct definition may also include the input rows and input columns for the construct, which may include standardized definitions for rows and columns from a data set. These standardized definitions may be implemented on a received data set during pre-processing steps, to facilitate implementing constructs on the received data set. The construct definition may further include textual content for the construct (e.g., instructions how to use the construct, when not to use the construct, and the like).

Each construct in a library (which may include hundreds, or even thousands of predetermined constructs), may be preformatted with all the measure and attribute and chart types defined by row and column. To that extent, the constructs represent the "building blocks" of the frameworks selected by users. This frees users from having to choose chart types, the rows and the columns to link to in a data set, and from manually building charts. As stated above, constructs, frameworks, and construct libraries may be utilized in fields other than just the financial context shown in FIG. 8. For example, constructs may be implemented to process and analyze product feedback, such as ratings, survey answers, test results during development, etc. In this case, a construct library may be built that uses scientific constructs.

Figure 9:
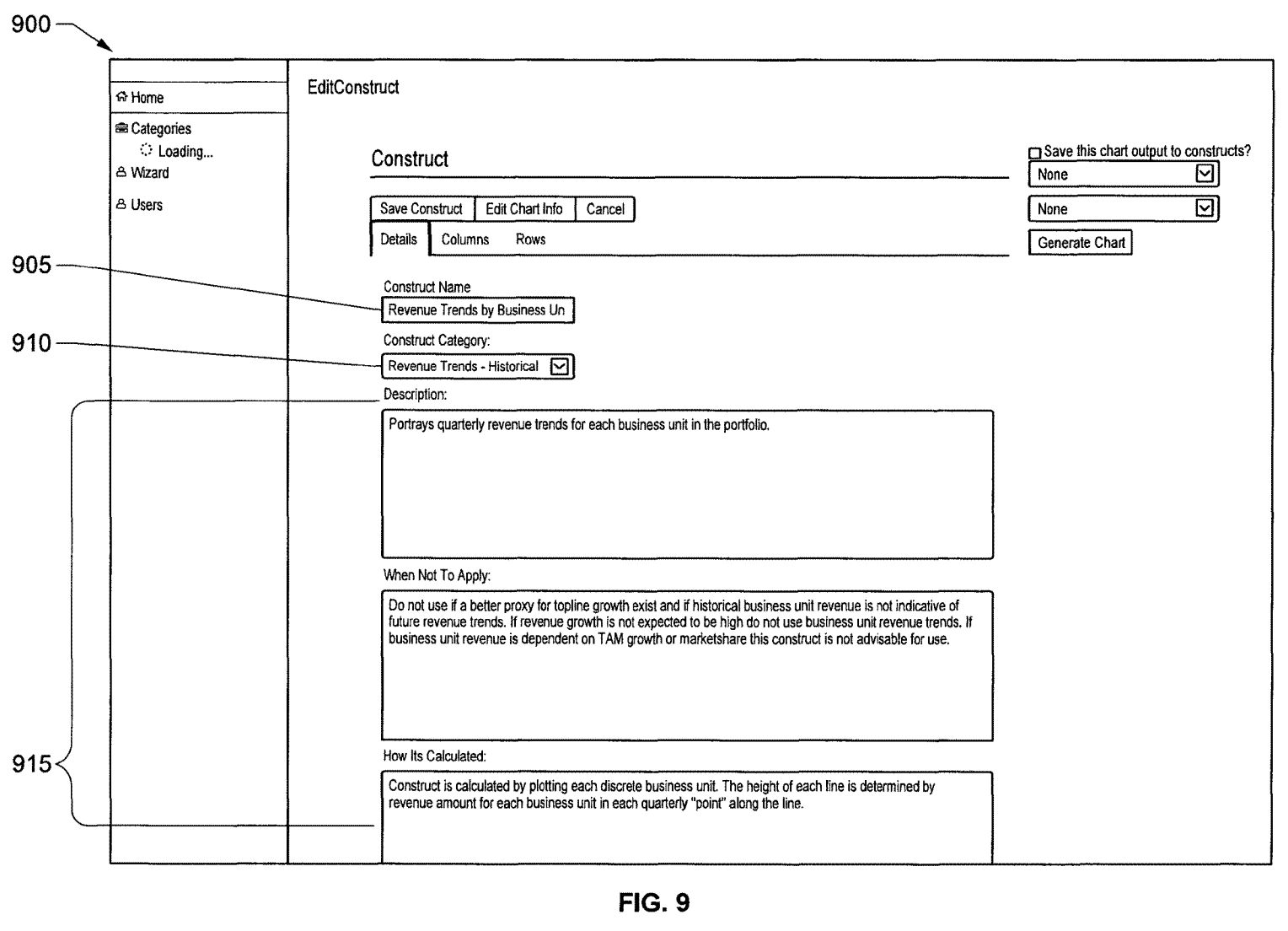

FIG. 9 is a screenshot 900 illustrating configurable settings according to an exemplary embodiment for creating and/or editing a construct. Interface 900 may be displayed when, for example, a user selects the option in area 820 to edit a construct. In some embodiments, interface 900 may be implemented as part of the construct builder 435. As shown in interface 900, a construct name assignment 905, a construct classification 910, and a construct definition 915 may be associated with each construct. The construct definition 915 may include a textual description of what processing is performed by the construct, a description of when not to apply the construct, and an explanation of how a construct output is calculated from received input data.

FIG. 10 is an exemplary hierarchy for a construct library 1000 according to an exemplary embodiment. The construct library 405 may be organized in a hierarchy, such as that shown in construct library 1000, which depicts an example that organizes constructs for financial planning analysis. The hierarchy of construct library 1000 includes topics, such as topic 1005, that each group a set of constructs into a uniform subject of consideration. In an embodiment, each topic 1005 may include a description of the subject matter of the topic, a description of the set of constructs 1010 contained therein, and the construct applications 1015 available that utilize the constructs 1010 of the topic 1005.

Construct library 1000 may also include constructs, such as construct 1010, and construct applications, such as construct application 1015. Each construct 1010 may be a rendering of data in a prescribed format according to a certain set of data constraints. In some embodiments, each construct may include a description of the construct, including a method of calculation, a description of when to use the construct, and additional commentary. A construct application 1015 may include a link to a plurality of use cases, where an associated construct 1010 has been applied to a specific data set, and the result has been stored. Each use case associated with the construct application 1015 may include a description of the specific data set and the use case scenario being documented.

Returning to FIG. 7, the server may receive a selection of a construct (e.g. construct 1010), from the construct library (e.g., library 1000) at step 715. In some embodiments, a plurality of constructs may be selected as part of a framework. The framework may be associated with a predetermined theme, and may be stored in the construct library. Frameworks may also be generated in response to receiving user input.

Figure 12:
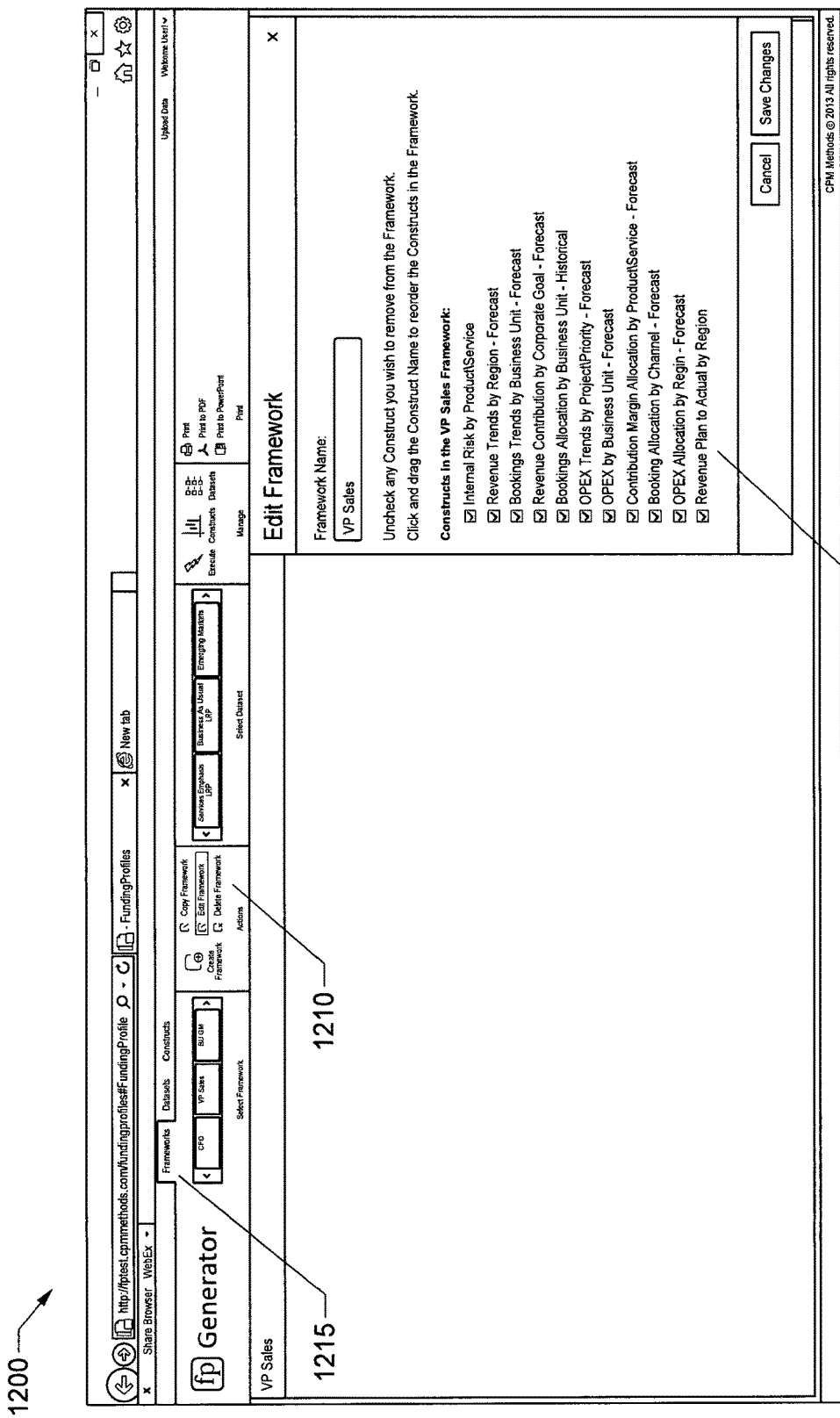
FIG. 12 is a screenshot illustrating an embodiment of a custom profile that includes a plurality of related constructs.

FIG. 12 is a screenshot illustrating an embodiment of a framework that includes a plurality of related constructs, and an interface 1200 for generating the framework. Interface 1200 may include a tab 1205 for selecting frameworks, and options 1210 for creating, editing, and deleting frameworks. In response to selecting the "edit framework" option of options 1210, dialog box 1215 may be presented to a user via a client device. Dialog box 1215 may include a checklist of constructs in the framework, and may provide the user with the options to remove, by deselecting, a construct from the framework. Via dialog box 1215, a user may also have the option to edit the name of the framework, which, again, may be user-created or previously stored on the server.

Returning to FIG. 7, the server may also receive a selection of a data set at step 720. The data set may be generated externally, and imported to the server, or be created by a client device in communication with the server.

Figure 11:
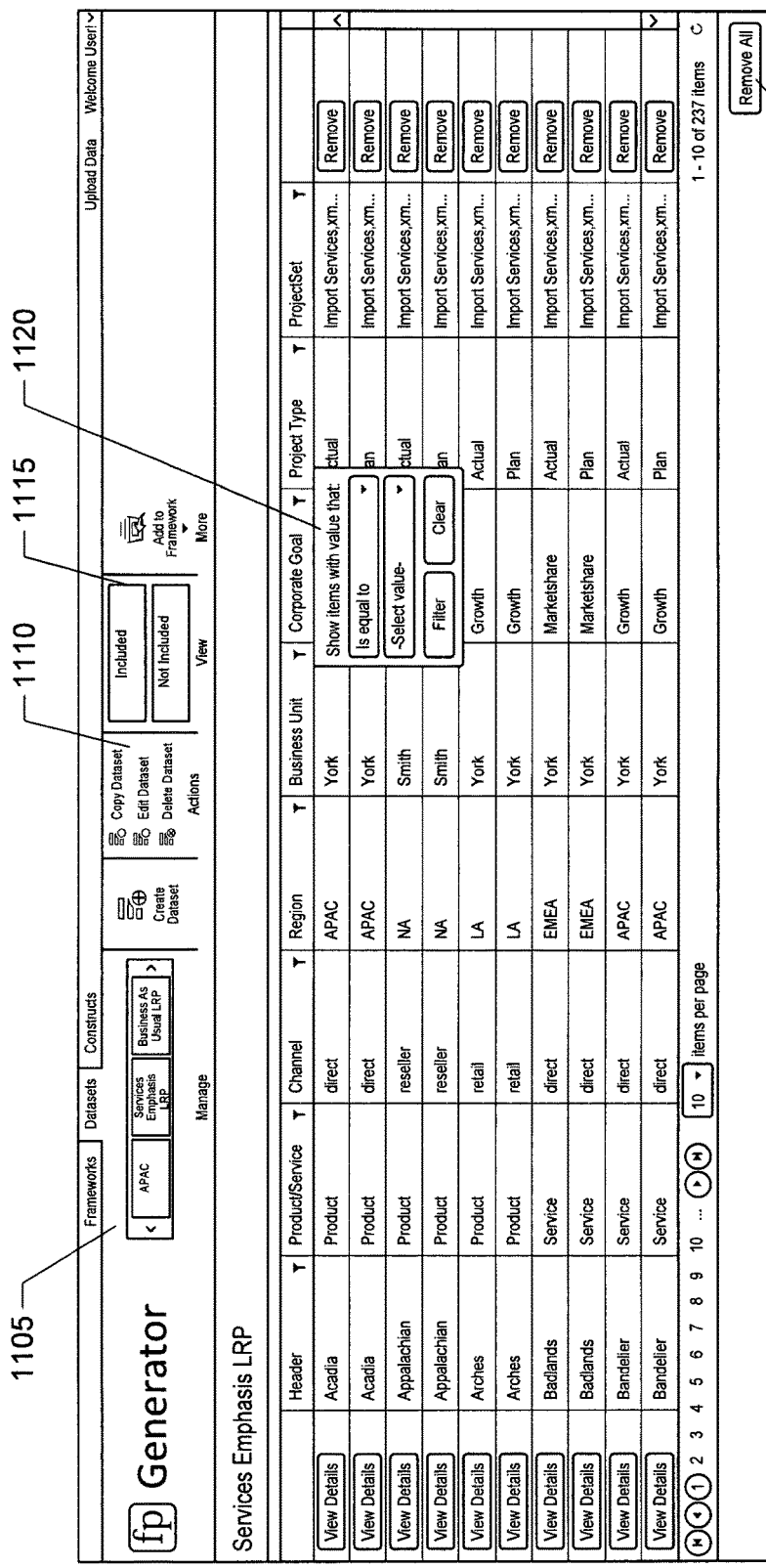
FIG. 11 is a screenshot illustrating configurable settings for a received data set according to various embodiments.

FIG. 11 is a screenshot of an interface 1100 illustrating configurable settings for a received data set according to various embodiments. The interface 1100 may include the highlighted data set name 1105, and options 1110 for copying, editing, creating and deleting the received dataset. Selectable options 1115 for viewing what data is included and excluded from the selected data base may also be provided. Tools may also be provided to manipulate the data set and/or filter views of the data. For example, selecting a field/column of the data set may cause filter toolbar 1120 to be displayed. Filter toolbar 1120 may permit a user to select options filtering the entries under the field by value e.g., display values greater than a user-provided threshold, less than the threshold, etc. Additionally, selectable option 1125 may be provided to add or remove all values from the data set, to advantageously speed data set manipulation.

Returning to FIG. 7, the server may map the received data set to the selected construct at step 725. The mapping may include identifying required fields for the construct to be applied, and locating the required fields in the selected data set. In some embodiments, the server may perform the mapping by parsing the selected data set and looking for terms that are similar to terms associated with the required fields for the construct.

At step 730, the server may apply the selected construct to the mapped data set. The applying may include automatically retrieving the received input data from the mapped data set and calculating the construct output. Furthermore, the server may automatically generate a first visualization based on the construct output at step 735. The server may then cause the first visualization to be displayed on a client device (e.g., the client device from which the construct selection and data set are received) at step 740. In some embodiments, a selected construct may be added (e.g., by the server) to a user-defined framework that includes a plurality of previously-selected constructs from the construct library. The server may apply the plurality of previously-selected constructs to the mapped data set to generate a construct output for each of the plurality of previously-selected constructs. The server may then automatically generate a plurality of visualizations, as described below with regard to FIG. 13. The first visualization may be one of the generated plurality of visualizations. Each of the plurality of visualizations may be rendered and displayed in an interface, each visualization being based on a construct output of one of the plurality of previously-selected constructs. Automatically applying multiple constructs to provide multiple visualizations in real time may be a great advantage of the profile generator compared to conventional business intelligence software, where a user would have to separately define a function, and manually bind the function to the data set to generate each chart, one-by-one.

Figure 13:
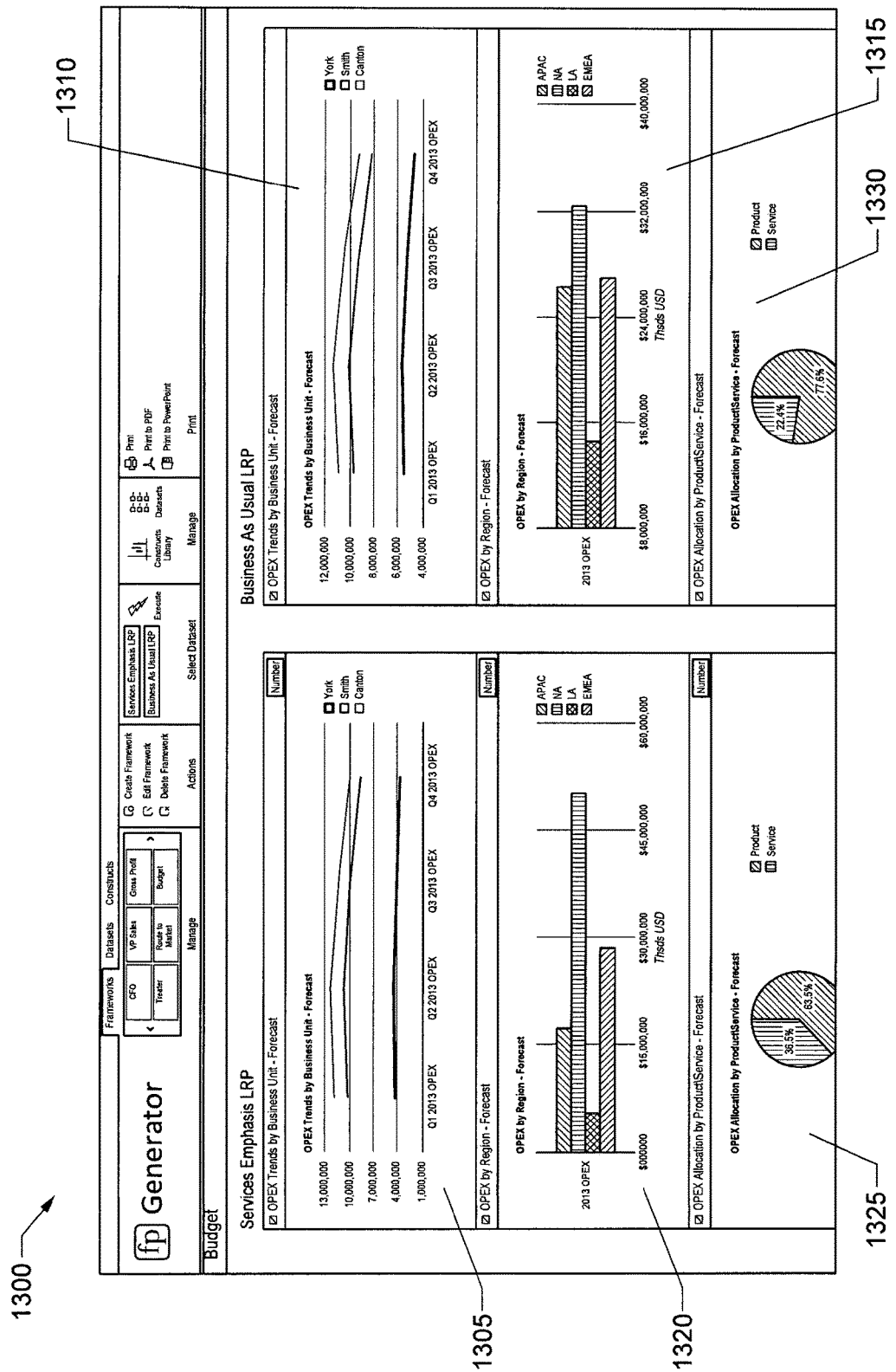
FIG. 13 is a screenshot illustrating an exemplary comparison generated by applying constructs to a plurality of data sets.

FIG. 13 is a screenshot illustrating an exemplary interface showing a comparison 1300 generated by applying constructs to a plurality of data sets. Visualizations, such as charts 1305, 1320, and 1325 may be generated by applying a set of constructs to a first data set, in this example titled "Services Emphasis LRP." First chart 1305, second chart 1320, and third chart 1325 may each be the result of applying a single construct per chart, or may be generated using the construct outputs of multiple constructs per chart.

A chart may be a subset of a construct. Each construct may define, as one of its variables, what type of chart will be used (line, bar, pie, bubble, etc) in the creation of that construct. However, in addition, a Construct may include what most applications call "measure" and "attribute" (or "value" and "attribute") built into the Construct. The construct's built-in measure and attribute may allow the construct to automatically render accurately without requiring the user to choose which chart type to use, which data sets to link to, which filters to apply, which measure and attribute values to use. Whereas users would follow the manual process for each chart they built using any other applications, with the profile generator, users may instead choose a framework and dataset and all the constructs that are part of that framework (no matter how many there are) are automatically applied, and the construct outputs may be displayed. Similarly, charts 1310, 1315 and 1330 may be generated by, for example, applying the framework (which includes the same set of constructs) to a second data set, in this example entitled "Business As Usual LRP." The present invention, as exemplified by method 700, advantageously may allow for comparisons between hypothetical and actual scenarios, facilitating data analysis by expediting the graphic comparison process between any two data sets.

Figure 14:
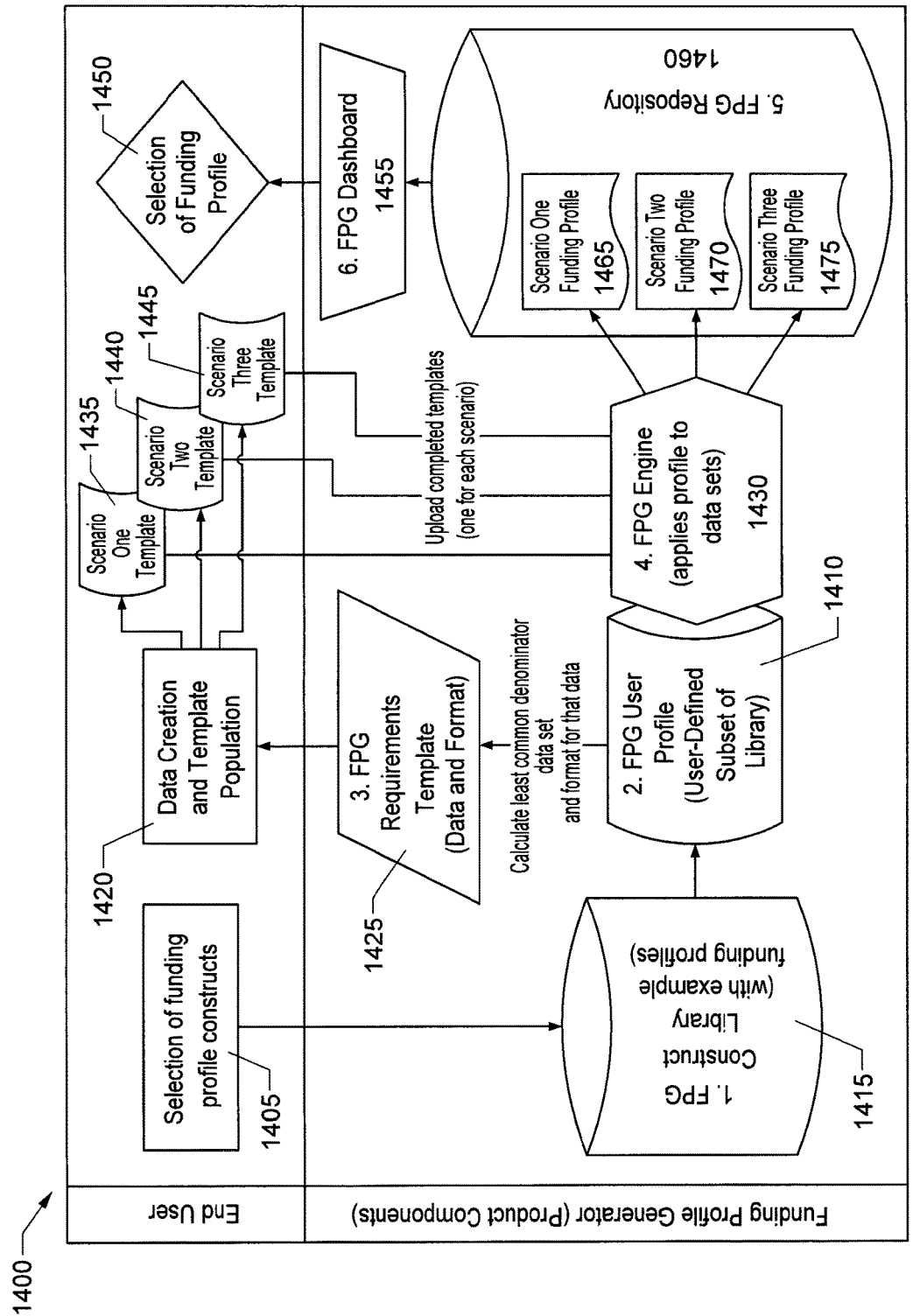
FIG. 14 shows a specific embodiment of a flow diagram applying constructs to a data set.

FIG. 14 shows a specific embodiment of a flow diagram for a method 1400 of applying constructs to a data set. Method 1400 may be implemented on a server, such as the server on which profile generator 440 may be implemented. At step 1405 a user may select a plurality of constructs from construct library 1415. The construct library 1415 may include a plurality of profiles, each profile including a plurality of constructs having a common theme. The user-selected constructs may be stored in user profile 1410, which may be a subset of the construct library 1415. After the constructs for the user profile 1410 have been selected, a requirements template 1425 for the user profile 1410 may be generated. In an exemplary embodiment, the requirements template 1425 may be generated by calculating, from the constructs in the user profile 1410, a least common denominator data set needed to apply the constructs and a format for the least common denominator data set.

At step 1420, data sets, selected by the user, may be received and templates for the constructs of the user profile 1410 may be generated. Each template generated at step 1420 may be a version of the requirements template 1425 populated with input data extracted from a received data set. In the exemplary embodiment of method 1400, three data sets have been received for three scenarios. The second data set and the third data sets may be modifications of the received (first) data set, wherein a record of the received data set is modified and a plurality of records of the received data are unchanged. Three templates may be generated at step 1420, by mapping, by the server, each of the received second data set and the received third data set: scenario one template 1435, scenario two template 1440 and scenario three template 1445.

The generated templates may then be provided to profile generator engine 1430, which may apply the constructs of the user profile 1410 to the received generated templates. The templates may be generated on the server prior to being provided to the profile generator engine 1430. The applying may include automatically retrieving the received input data from the mapped second data set and the mapped third data set and calculating the construct output for each of the mapped second data set and the mapped third data set in an exemplary embodiment.

A funding profile, including the construct outputs of the user profile 1410, for each of the three scenarios may be calculated by the profile generator engine 1430, resulting in scenario one funding profile 1465, scenario two funding profile 1470, and scenario three funding profile 1475 being calculated. Each scenario being compared may include the same framework being applied to different data sets, which may facilitate side-by-side comparison in an interface. Each funding profile may include one or more visualizations, such as the visualizations shown in FIG. 13. The visualizations may be automatically generated; for example, a second chart may be based on the second construct output (e.g., visualization 1315) and a third chart may be based on the third construct output (e.g, visualization 1325). The generated visualizations may then be displayed on the client device. Rendering the visualizations may be performed on the profile generator 440, on the client device, or any combination thereof.

The calculated funding profiles may be stored in profile generator repository 1460, and subsequently may be displayed to the client via profile generator dashboard 1455. The user may accordingly select a scenario funding profile at step 1450, selecting from scenario one funding profile 1465, scenario two funding profile 1470, and scenario three funding profile 1475 based on a desired outcome. For example, a selection of one of the first chart, the second chart, and the third chart may be made by the user.

Figure 15:
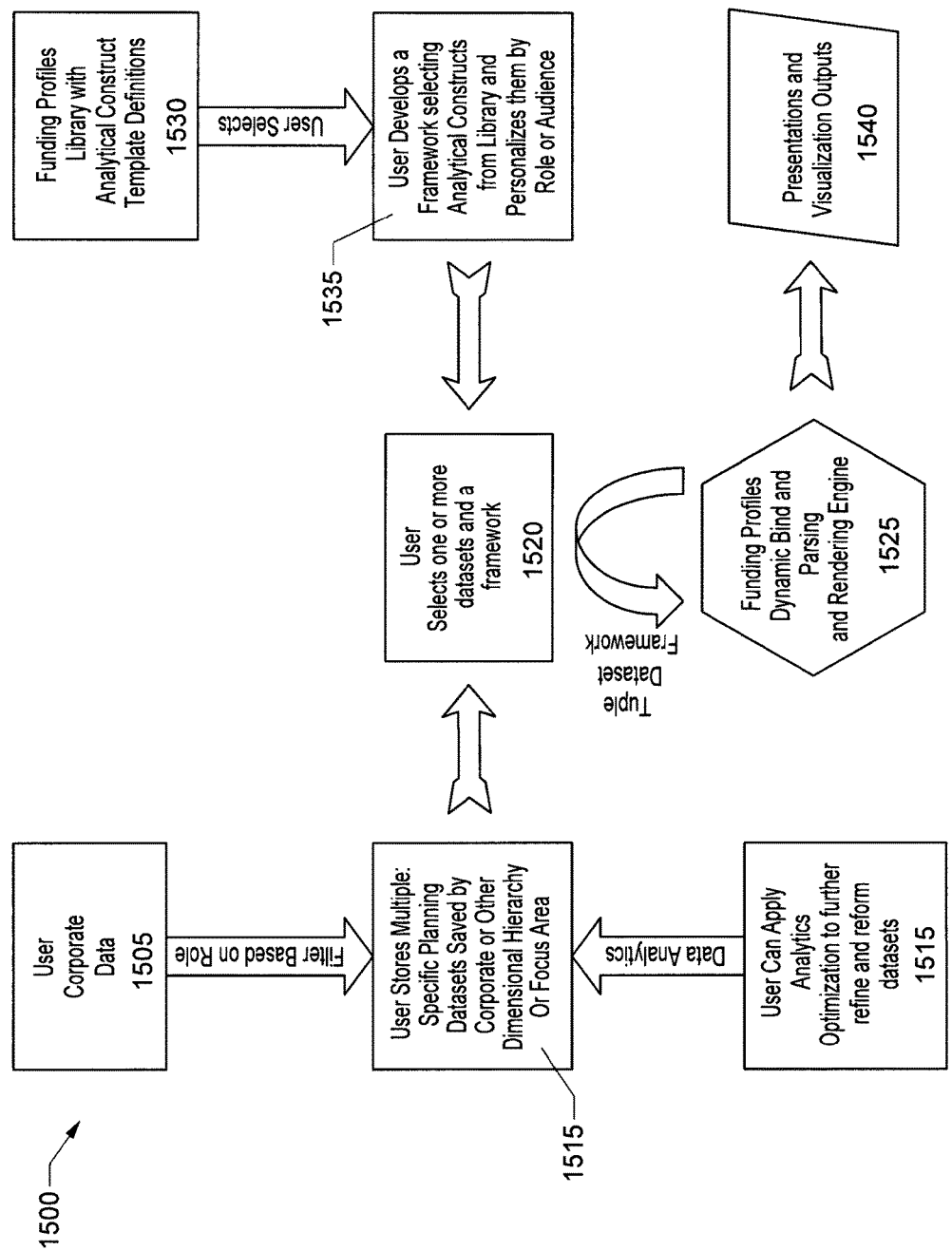
FIG. 15 shows a specific embodiment of a flow diagram applying constructs for to a data set.

FIG. 15 shows a specific embodiment of a flow diagram for a method 1500 for applying constructs to a data set. Similarly to system 4000, user corporate data 1505 is received and construct library 1530 is provided. At step 1510, multiple specific data sets are received. Analytics optimization to further refine and reform the received datasets may be applied at step 1515. At step 1535, a framework may be generated that includes a plurality of analytical constructs from the construct library 1530. In an exemplary embodiment, the constructs may be edited to personalize the constructs to a desired role or audience.

At step 1520, the server may receive a user selection of one or more of the datasets stored at step 1510. Also at step 1520, the server may receive a user selection of a framework. The framework may be a user-created framework, such as the framework generated at step 1535, or a predetermined framework stored in the construct library 1530. At step 1525, the constructs of the selected frame work may be applied to the selected data sets. The applying may include using a parsing and rendering engine to map the dataset to the constructs of the selected framework. The applying the framework to the selected datasets may also include calculating construct outputs for the framework, which may include visualizations (e.g., charts, graphs, tables, and the like). These visualizations of the construct outputs may be displayed on a client device at step 1540.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

What is claimed is:

1. A method comprising:
providing, by a server, a construct library comprising a plurality of constructs, the plurality of constructs being organized into a hierarchical system based on topics, each construct comprising a predetermined processing method that calculates a construct output based on received input data;
receiving, by the server, a selection of a construct from the construct library;
adding, by the server, the selected construct to a user-created framework, the user-created framework comprising a plurality of previously-selected constructs from the construct library, the user-created framework being stored on the server;
applying, by the server, the user-created framework to a plurality of data sets, the applying comprising, for each data set:
receiving, by the server, the data set;
mapping, by the server, the received data set to each of the plurality of constructs of the user-created framework, the mapping comprising identifying required fields for each of the plurality of constructs, locating the required fields in the received data set, and linking the located required fields to each of the plurality of constructs; and
applying, by the server, each of the plurality of constructs to the mapped data set, the applying comprising automatically retrieving the received input data from the mapped data set and calculating the construct output of each of the plurality of constructs based on the retrieved input data;
automatically generating, by the server, a first visualization based on construct outputs of the plurality of constructs applied to a first data set of the plurality of data sets;
causing, by the server, the first visualization to be displayed on a client device;
automatically generating, by the server, a second visualization based on construct outputs of the plurality of constructs applied to a second data set of the plurality of data sets; and
causing, by the server, the second visualization to be displayed on the client device.

2. The method of claim 1, wherein the second data set and a third data set of the plurality of data sets are modifications of the first data set wherein a record of the first data set is modified and a plurality of records are unchanged, the method further comprising:
automatically generating, by the server, a third visualization based on construct outputs of the plurality of constructs applied to the third data set;
causing, by the server, the third visualization to be displayed on the client device with the first visualization and the second visualization; and
receiving a selection of one of the first visualization, the second visualization, and the third visualization.

3. The method of claim 1, further comprising:
automatically generating a plurality of visualizations based on the construct outputs of the first data set, the first visualization being one of the generated plurality of visualizations, each of the generated plurality of visualizations being based on a construct output of one of the plurality of constructs of the user-created framework.

4. The method of claim 1, wherein each construct includes a construct description and a description of when not to apply the construct.

5. The method of claim 1, each construct further comprising a construct template, the construct template comprising fields associated with input data for the predetermined processing method and a data format associated with the predetermined processing method, the mapping the received data set comprising:
retrieving the construct template;
extracting the received input data from the received data set; and
populating the construct template with the received input data to generate the mapped data set.

6. The method of claim 1, further comprising receiving a new construct, the new construct comprising a construct definition, the construct definition comprising a definition of a visualization type, input rows and input columns, and textual content for the new construct, and a construct classification, and adding the new construct to the construct library, the construct classification being associated with a topic in the hierarchical system.

7. The method of claim 6, further comprising adding the new construct to a construct repository that is external to the server, the construct repository being accessible by a plurality of users over a network.

8. The method of claim 1, further comprising receiving a selection of a predetermined framework from the construct library, the predetermined framework comprising a predetermined set of constructs from the construct library relating to a common theme, mapping the first data set to the predetermined set of constructs, applying the predetermined set of constructs to the mapped first data set, and causing output of the predetermined set of constructs to be displayed on the client device.

9. A system comprising:
a stored construct library comprising a plurality of constructs, the plurality of constructs being organized into a hierarchical system based on topics associated with financial planning, each construct comprising a predetermined processing method that calculates a construct output based on received input data; and
a server communicatively coupled to a network, the server executing instructions stored in memory to:
receive a selection of a construct from the construct library;
add the selected construct to a user-created framework, the user-created framework comprising a plurality of previously-selected constructs from the construct library, the user-created framework being stored on the server;
apply the user-created framework to a plurality of data sets, the applying comprising, for each data set:
mapping the received data set to each of the plurality of constructs of the user-created framework, the mapping comprising identifying required fields for each of the plurality of constructs, locating the required fields in the received data set, and linking the located required fields to each of the plurality of constructs; and
applying each of the plurality of constructs to the mapped data set, the applying comprising automatically retrieving the received input data from the mapped data set and calculating the construct output of each of the plurality of constructs based on the retrieved input data;
automatically generate a first visualization based on construct outputs of the plurality of constructs applied to a first data set of the plurality of data sets;
cause the first visualization to be displayed on a client device;
automatically generate a second visualization based on construct outputs of the plurality of constructs applied to a second data set of the plurality of data sets; and
cause the second visualization to be displayed on the client device.

10. The system of claim 9, wherein the second data set and a third data set of the plurality of data sets are modifications of the first data set wherein a record of the first data set is modified and a plurality of records are unchanged, the server further executing instructions stored in memory to:
automatically generate a third visualization based on construct outputs of the plurality of constructs applied to the third data set;
cause the third visualization to be displayed on the client device with the first visualization and the second visualization; and
receive a selection of one of the first visualization, the second visualization, and the third visualization.

11. The system of claim 9, the server further executing instructions stored in memory to:
automatically generate a plurality of visualizations based on the construct outputs of the first data set, the first visualization being one of the generated plurality of visualizations, each of the generated plurality of visualizations being based on a construct output of one of the plurality of constructs of the user-created framework.

12. The system of claim 9, wherein each construct includes a construct description and a description of when not to apply the construct.

13. The system of claim 9, each construct further comprising a construct template, the construct template comprising fields associated with input data for the predetermined processing method and a data format associated with the predetermined processing method, the mapping the received data set comprising:
retrieving the construct template;
extracting the received input data from the received data set; and
populating the construct template with the received input data to generate the mapped data set.

14. The system of claim 9, the server further executing instructions stored in memory to receive a new construct, the new construct comprising a construct definition, the construct definition comprising a definition of a visualization type, input rows and input columns, and textual content for the new construct, and a construct classification, and add the new construct to the construct library, the construct classification being associated with a topic in the hierarchical system.

15. The system of claim 9, the server further executing instructions stored in memory to: receive a selection of a predetermined framework from the construct library, the predetermined framework comprising a predetermined set of constructs from the construct library relating to a common theme, map the first data set to the predetermined set of constructs, apply the predetermined set of constructs to the mapped first data set, and cause output of the predetermined set of constructs to be displayed on the client device.

16. A non-transitory computer readable storage medium having embodied thereon a program, the program being executable by a processor for performing a method comprising:

provviding, by a server, a construct library comprising a plurality of constructs, the plurality of constructs being organized into a hierarchical system based on topics, each construct comprising a predetermined processing method that calculates a construct output based on received input data;

receiving, by the server, a selection of a construct from the construct library;

adding, by the server, the selected construct to a user-created framework, the user-created framework comprising a plurality of previously-selected constructs from the construct library, the user-created framework being stored on the server;

applying, by the server, the user-created framework to a plurality of data sets, the applying comprising, for each data set:

receiving, by the server, a data set;

mapping, by the server, the received data set to each of the plurality of constructs of the user-created framework, the mapping comprising identifying required fields for each of the plurality of constructs, locating the required fields in the received data set, and linking the located required fields to each of the plurality of constructs; and applying, by the server, each of the plurality of constructs to the mapped data set, the applying comprising automatically retrieving the received input data from the mapped data set and calculating the construct output of each of the plurality of constructs based on the retrieved input data;

automatically generating, by the server, a first visualization based on construct outputs of the plurality of constructs applied to a first data set of the plurality of data sets;

causing, by the server, the first visualization to be displayed on a client device;

automatically generating, by the server, a second visualization based on construct outputs of the plurality of constructs applied to a second data set of the plurality of data sets; and causing, by the server, the second visualization to be displayed on the client device.

17. The non-transitory computer readable storage medium of claim 16, wherein the second data set and a third data set of the plurality of data sets are modifications of the first data set wherein a record of the first data set is modified and a plurality of records are unchanged, the method further comprising:

automatically generating, by the server, a third visualization based on construct outputs of the plurality of constructs applied to the third data set;

causing, by the server, the third visualization to be displayed on the client device with the first visualization and the second visualization;

receiving a selection of one of the first visualization, the second visualization, and the third visualization; and designating the selected visualization as a funding profile.

18. The non-transitory computer readable storage medium of claim 16, the method further comprising:

automatically generating a plurality of visualizations based on the construct outputs of the first data set, the first visualization being one of the generated plurality of visualizations, each of the generated plurality of visualizations being based on a construct output of one of the plurality of constructs of the user-created framework.

19. The non-transitory computer readable storage medium of claim 16, each construct further comprising a construct template, the construct template comprising fields associated with input data for the predetermined processing method and a data format associated with the predetermined processing method, the mapping the received data set comprising:

retrieving the construct template;

extracting the received input data from the received data set; and populating the construct template with the received input data to generate the mapped data set.

20. The non-transitory computer readable storage medium of claim 16, the method further comprising receiving a new construct, the new construct comprising a construct definition and a construct classification, and adding the new construct to the construct library, the construct classification being associated with a topic in the hierarchical system.

* * * * *